(12) United States Patent
Kawagoe et al.

(10) Patent No.: US 7,552,378 B2
(45) Date of Patent: Jun. 23, 2009

(54) SEMICONDUCTOR DEVICE IMPROVING ERROR CORRECTION PROCESSING RATE

(75) Inventors: Tomoya Kawagoe, Hyogo (JP); Tsukasa Ooishi, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 606 days.

(21) Appl. No.: 11/148,365

(22) Filed: Jun. 9, 2005

(65) Prior Publication Data
US 2005/0289441 A1 Dec. 29, 2005

(30) Foreign Application Priority Data
Jun. 29, 2004 (JP) ............................. 2004-191246

(51) Int. Cl.
*G11C 29/00* (2006.01)
(52) U.S. Cl. .................. 714/773; 365/200; 714/801
(58) Field of Classification Search ................. 714/773, 714/801; 365/200
See application file for complete search history.

(56) References Cited

U.S. PATENT DOCUMENTS

| | | | | |
|---|---|---|---|---|
| 3,825,893 A | * | 7/1974 | Bossen et al. ............... | 714/757 |
| 3,891,969 A | * | 6/1975 | Christensen ................ | 714/801 |
| 4,456,980 A | * | 6/1984 | Yamada et al. .............. | 365/200 |
| 4,547,882 A | * | 10/1985 | Tanner ....................... | 714/755 |
| 4,794,597 A | * | 12/1988 | Ooba et al. .................. | 714/703 |
| 4,817,052 A | * | 3/1989 | Shinoda et al. ............. | 365/104 |
| 5,003,542 A | * | 3/1991 | Mashiko et al. ............. | 714/772 |
| 5,012,472 A | * | 4/1991 | Arimoto et al. ............. | 714/754 |
| 5,134,616 A | * | 7/1992 | Barth et al. .................. | 714/711 |
| 5,376,829 A | * | 12/1994 | Rogers et al. ............... | 327/408 |
| 5,523,707 A | * | 6/1996 | Levy et al. ..................... | 326/52 |
| 5,528,177 A | * | 6/1996 | Sridhar et al. ............... | 326/113 |
| 7,117,420 B1 | * | 10/2006 | Yeung et al. ................. | 714/763 |
| 7,177,420 B2 | * | 2/2007 | Carter ......................... | 379/447 |

FOREIGN PATENT DOCUMENTS

| JP | 5-144291 | 6/1993 |
|---|---|---|
| JP | 2000-132995 | 5/2000 |

OTHER PUBLICATIONS

Masaaki Mitani, "Industrial Mathematics for Restudy," Jan. 1, 2001, CQ Publishing Co., Ltd., pp. 47-53 (Translation Provided).

* cited by examiner

*Primary Examiner*—Stephen M Baker
(74) *Attorney, Agent, or Firm*—McDermott Will & Emery LLP

(57) ABSTRACT

In an exclusive OR circuit (XOR gate) constituting an ECC circuit, the drivability of P channel MOS transistors is set larger than the drivability of N channel MOS transistors. Accordingly, the speed of the logic level of an output node being set to an H level from an L level identified as a reset state is increased than the case where the drivability is set equal. Thus, the time required to output a syndrome from a plurality of stages of XOR gates can be reduced to allow execution of error correction processing at high speed.

10 Claims, 17 Drawing Sheets

FIG.3

| INPUT SIGNAL (DATA OUTPUT FROM MEMORY ARRAY) | PARITY CIRCUIT PC5 | PARITY CIRCUIT PC4 | PARITY CIRCUIT PC3 | PARITY CIRCUIT PC2 | PARITY CIRCUIT PC1 | PARITY CIRCUIT PC0 | |
|---|---|---|---|---|---|---|---|
| P2  | 0 | 0 | 0 | 1 | 0 | 0 | 1 |
| D0  | 0 | 0 | 1 | 0 | 0 | 1 | 2 |
| D1  | 0 | 1 | 0 | 0 | 1 | 0 | 2 |
| D2  | 1 | 0 | 0 | 1 | 0 | 0 | 2 |
| D3  | 1 | 0 | 1 | 0 | 0 | 0 | 2 |
| D4  | 0 | 1 | 1 | 0 | 0 | 1 | 3 |
| D5  | 0 | 1 | 0 | 1 | 1 | 0 | 3 |
| D6  | 1 | 0 | 0 | 1 | 0 | 1 | 3 |
| D7  | 0 | 0 | 1 | 0 | 1 | 1 | 3 |
| D8  | 1 | 1 | 0 | 0 | 1 | 0 | 3 |
| P4  | 0 | 1 | 0 | 0 | 0 | 0 | 1 |
| D9  | 0 | 1 | 1 | 0 | 0 | 0 | 2 |
| D10 | 0 | 0 | 0 | 1 | 1 | 0 | 2 |
| D11 | 1 | 0 | 0 | 0 | 0 | 1 | 2 |
| D12 | 1 | 0 | 0 | 0 | 1 | 0 | 2 |
| D13 | 0 | 0 | 1 | 1 | 0 | 1 | 3 |
| D14 | 0 | 1 | 0 | 0 | 1 | 1 | 3 |
| D15 | 1 | 1 | 0 | 1 | 0 | 0 | 3 |
| D16 | 0 | 0 | 1 | 1 | 1 | 0 | 3 |
| D17 | 1 | 0 | 1 | 0 | 0 | 1 | 3 |
| P3  | 0 | 0 | 1 | 0 | 0 | 0 | 1 |
| P1  | 0 | 0 | 0 | 0 | 1 | 0 | 1 |
| P5  | 1 | 0 | 0 | 0 | 0 | 0 | 1 |
| D18 | 1 | 0 | 0 | 0 | 1 | 1 | 3 |
| D19 | 0 | 1 | 1 | 0 | 1 | 0 | 3 |
| D20 | 1 | 0 | 1 | 1 | 0 | 0 | 3 |
| D21 | 1 | 0 | 1 | 0 | 1 | 0 | 3 |
| D22 | 0 | 1 | 0 | 1 | 0 | 1 | 3 |
| P0  | 0 | 0 | 0 | 0 | 0 | 1 | 1 |
| D23 | 0 | 0 | 1 | 1 | 0 | 0 | 2 |
| D24 | 0 | 0 | 0 | 0 | 1 | 1 | 2 |
| D25 | 1 | 1 | 0 | 0 | 0 | 0 | 2 |
| D26 | 0 | 0 | 1 | 0 | 1 | 0 | 2 |
| D27 | 0 | 1 | 1 | 1 | 0 | 0 | 3 |
| D28 | 0 | 0 | 0 | 1 | 1 | 1 | 3 |
| D29 | 1 | 1 | 0 | 0 | 0 | 1 | 3 |
| D30 | 1 | 1 | 1 | 0 | 0 | 0 | 3 |
| D31 | 1 | 0 | 0 | 1 | 1 | 0 | 3 |
|     | 16 | 14 | 16 | 14 | 16 | 14 | |

SUBGROUP SG0: P2–D8
SUBGROUP SG1: P4–D17
SUBGROUP SG2: P3–D22
SUBGROUP SG3: P0–D31

FIG.11A

| INPUT SIGNAL (DATA OUTPUT FROM MEMORY ARRAY) | PARITY CIRCUIT PC6# | PARITY CIRCUIT PC5# | PARITY CIRCUIT PC4# | PARITY CIRCUIT PC3# | PARITY CIRCUIT PC2# | PARITY CIRCUIT PC1# | PARITY CIRCUIT PC0# | |
|---|---|---|---|---|---|---|---|---|
| 1 D63 | 1 | 1 | 0 | 1 | 0 | 0 | 1 | 4 |
| 2 D62 | 1 | 0 | 1 | 1 | 1 | 0 | 0 | 4 |
| 3 D61 | 0 | 1 | 1 | 1 | 0 | 1 | 0 | 4 |
| 4 D60 | 0 | 0 | 1 | 1 | 1 | 1 | 0 | 4 |
| 5 D59 | 1 | 1 | 0 | 0 | 0 | 0 | 0 | 2 |
| 6 D58 | 1 | 0 | 0 | 0 | 0 | 0 | 1 | 2 |
| 7 D57 | 0 | 0 | 1 | 0 | 1 | 1 | 0 | 3 |
| 8 D56 | 0 | 1 | 0 | 0 | 0 | 0 | 1 | 2 |
| 9 D55 | 1 | 1 | 1 | 1 | 0 | 0 | 0 | 4 |
| 10 D54 | 0 | 0 | 0 | 1 | 1 | 1 | 1 | 4 |
| 11 D53 | 1 | 0 | 1 | 0 | 0 | 1 | 0 | 3 |
| 12 D52 | 1 | 0 | 0 | 1 | 0 | 0 | 1 | 3 |
| 13 D51 | 1 | 0 | 0 | 0 | 0 | 1 | 1 | 3 |
| 14 D50 | 0 | 1 | 1 | 0 | 1 | 0 | 0 | 3 |
| 15 D49 | 0 | 0 | 0 | 1 | 0 | 1 | 1 | 3 |
| 16 D48 | 0 | 1 | 1 | 0 | 0 | 0 | 0 | 2 |
| 17 D47 | 0 | 1 | 0 | 0 | 1 | 0 | 0 | 2 |
| 18 D46 | 0 | 0 | 1 | 0 | 1 | 0 | 0 | 2 |
| 19 D45 | 1 | 0 | 0 | 1 | 0 | 1 | 0 | 3 |
| 20 D44 | 0 | 1 | 0 | 1 | 1 | 0 | 0 | 3 |
| 21 D43 | 0 | 1 | 0 | 1 | 0 | 0 | 1 | 3 |
| 22 D42 | 0 | 1 | 0 | 0 | 1 | 0 | 1 | 3 |
| 23 D41 | 0 | 0 | 0 | 1 | 1 | 0 | 1 | 3 |
| 24 D40 | 1 | 0 | 1 | 0 | 0 | 0 | 0 | 2 |
| 25 D39 | 1 | 0 | 0 | 0 | 0 | 1 | 0 | 2 |
| 26 D38 | 0 | 0 | 1 | 0 | 0 | 1 | 0 | 2 |
| 27 P6 | 1 | 0 | 0 | 0 | 0 | 0 | 0 | 1 |
| 28 P5 | 0 | 1 | 0 | 0 | 0 | 0 | 0 | 1 |
| 29 P4 | 0 | 0 | 1 | 0 | 0 | 0 | 0 | 1 |

SUBGROUP SG0#: rows 1–8
SUBGROUP SG1#: rows 9–29

FIG.11B

| INPUT SIGNAL (DATA OUTPUT FROM MEMORY ARRAY) | PARITY CIRCUIT PC6# | PARITY CIRCUIT PC5# | PARITY CIRCUIT PC4# | PARITY CIRCUIT PC3# | PARITY CIRCUIT PC2# | PARITY CIRCUIT PC1# | PARITY CIRCUIT PC0# | |
|---|---|---|---|---|---|---|---|---|
| 30 D37 | 1 | 1 | 0 | 1 | 1 | 0 | 0 | 4 |
| 31 D36 | 1 | 0 | 1 | 0 | 0 | 1 | 1 | 4 |
| 32 D35 | 0 | 1 | 1 | 0 | 0 | 1 | 1 | 4 |
| 33 D34 | 1 | 0 | 0 | 1 | 1 | 0 | 0 | 3 |
| 34 D33 | 0 | 1 | 1 | 0 | 0 | 1 | 0 | 3 |
| 35 D32 | 0 | 1 | 1 | 0 | 0 | 0 | 1 | 3 |
| 36 D31 | 0 | 1 | 0 | 0 | 0 | 1 | 1 | 3 |
| 37 D30 | 0 | 0 | 1 | 0 | 0 | 1 | 1 | 3 |
| 38 D29 | 1 | 0 | 0 | 1 | 0 | 0 | 0 | 2 |
| 39 D28 | 1 | 0 | 0 | 0 | 1 | 0 | 0 | 2 |
| 40 D27 | 0 | 0 | 0 | 1 | 1 | 0 | 0 | 2 |
| 41 D26 | 1 | 0 | 1 | 0 | 1 | 0 | 0 | 3 |
| 42 D25 | 1 | 0 | 1 | 0 | 0 | 0 | 1 | 3 |
| 43 D24 | 1 | 0 | 0 | 0 | 1 | 0 | 1 | 3 |
| 44 D23 | 0 | 1 | 0 | 1 | 0 | 1 | 0 | 3 |
| 45 D22 | 0 | 0 | 1 | 0 | 1 | 0 | 1 | 3 |
| 46 D21 | 0 | 1 | 0 | 1 | 0 | 0 | 0 | 2 |
| 47 D20 | 0 | 1 | 0 | 0 | 0 | 1 | 0 | 2 |
| 48 D19 | 0 | 0 | 0 | 1 | 0 | 1 | 0 | 2 |
| 49 P3 | 0 | 0 | 0 | 1 | 0 | 0 | 0 | 1 |
| 50 P2 | 0 | 0 | 0 | 0 | 1 | 0 | 0 | 1 |
| 51 D18 | 1 | 1 | 1 | 0 | 1 | 0 | 0 | 4 |
| 52 D17 | 1 | 0 | 0 | 1 | 1 | 1 | 0 | 4 |
| 53 D16 | 0 | 1 | 1 | 1 | 0 | 0 | 1 | 4 |
| 54 D15 | 1 | 1 | 0 | 0 | 1 | 0 | 0 | 3 |
| 55 D14 | 1 | 1 | 0 | 0 | 0 | 1 | 0 | 3 |
| 56 D13 | 1 | 0 | 0 | 0 | 1 | 1 | 0 | 3 |
| 57 D12 | 0 | 1 | 0 | 0 | 1 | 1 | 0 | 3 |
| 58 D11 | 0 | 0 | 1 | 1 | 0 | 0 | 1 | 3 |
| 59 D10 | 0 | 0 | 1 | 1 | 0 | 0 | 0 | 2 |
| 60 D09 | 0 | 0 | 1 | 0 | 0 | 0 | 1 | 2 |
| 61 D08 | 0 | 0 | 0 | 1 | 0 | 0 | 1 | 2 |
| 62 D07 | 1 | 1 | 1 | 0 | 0 | 0 | 0 | 3 |
| 63 D06 | 1 | 1 | 0 | 1 | 0 | 0 | 0 | 3 |
| 64 D05 | 1 | 0 | 1 | 1 | 0 | 0 | 0 | 3 |
| 65 D04 | 0 | 1 | 1 | 1 | 0 | 0 | 0 | 3 |
| 66 D03 | 0 | 0 | 0 | 0 | 1 | 1 | 1 | 3 |
| 67 D02 | 0 | 0 | 0 | 0 | 1 | 1 | 0 | 2 |
| 68 D01 | 0 | 0 | 0 | 0 | 1 | 0 | 1 | 2 |
| 69 D00 | 0 | 0 | 0 | 0 | 0 | 1 | 1 | 2 |
| 70 P1 | 0 | 0 | 0 | 0 | 0 | 1 | 0 | 1 |
| 71 P0 | 0 | 0 | 0 | 0 | 0 | 0 | 1 | 1 |
| 0 (NO ERROR) | 0 | 0 | 0 | 0 | 0 | 0 | 0 | 0 |
| | 28 | 28 | 28 | 28 | 26 | 26 | 26 | |

SUBGROUP SG2# : rows 30 D37 – 50 P2
SUBGROUP SG3# : rows 51 D18 – 71 P0

FIG.12A
FIG.12B
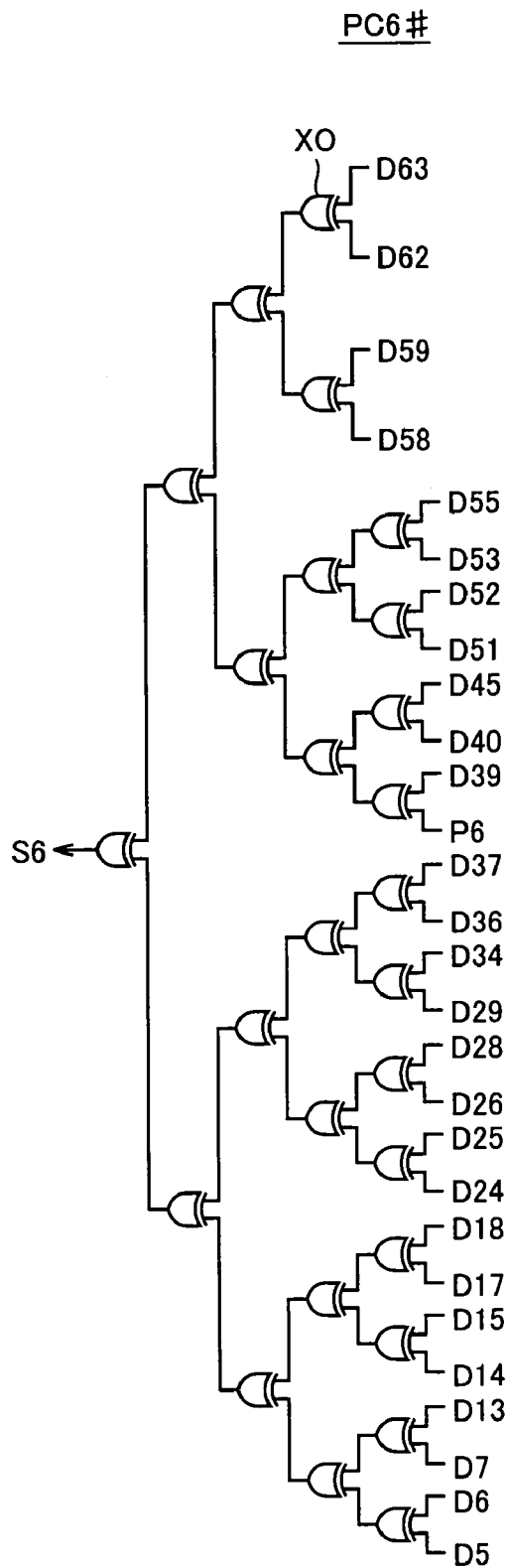
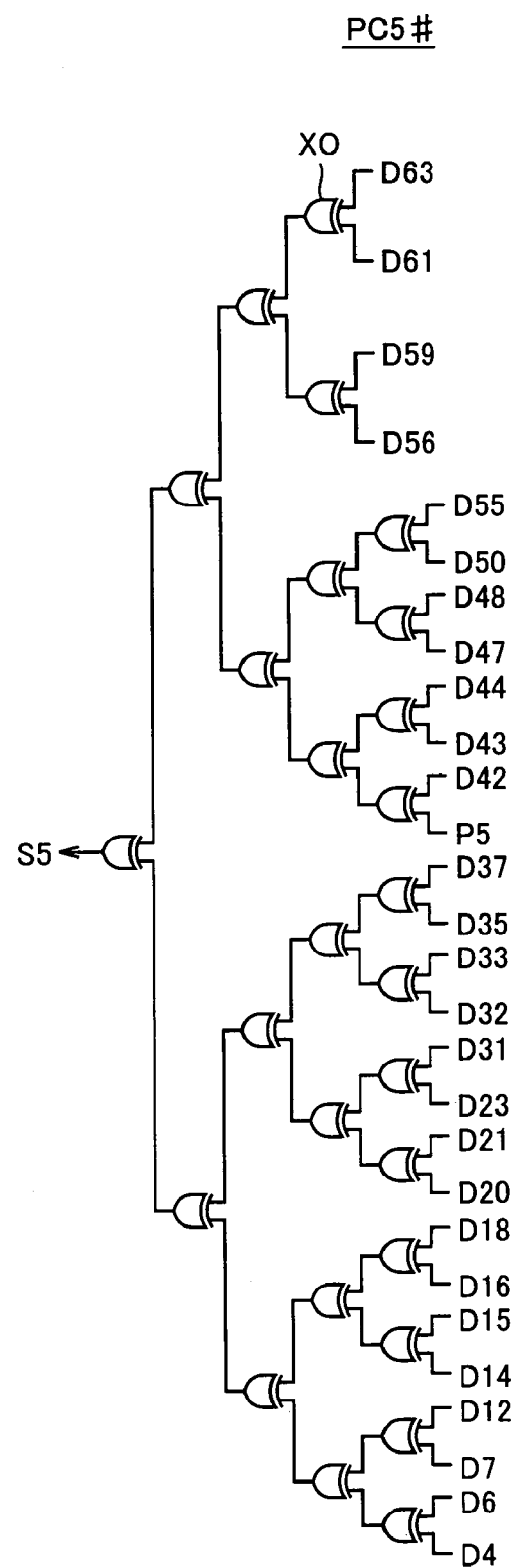

PC2#

PC1#

SEMICONDUCTOR DEVICE IMPROVING ERROR CORRECTION PROCESSING RATE

BACKGROUND OF THE INVENTION

1. Field of the Invention

The present invention relates to a semiconductor device including an error correcting circuit (ECC).

2. Description of the Background Art

In semiconductor devices such as semiconductor memory devices, bit errors caused by hardware failure are encountered. There is also known a phenomenon called "soft error", caused by the generation of pairs of electrons and holes in the silicon substrate when radiation such as α rays and neutron rays present in nature is introduced into the chip, leading to the possibility of destroying, in the worst case, data stored in the storage node of a memory cell.

Reflecting the recent progress in semiconductor processing, i.e. development in microminiaturization, the size of the storage element per se has been reduced in contrast to the increase of the storage capacity. The capacity of the storage node storing data has become smaller. It is known that the resistance with respect to soft error becomes lower as the storage capacity of the storage node in which data is stored is reduced. The bit error caused by such soft error has become a critical problem.

There is conventionally known a semiconductor device including an ECC circuit that executes error correction processing on a bit error to address such bit errors.

For example, when error correction processing using a Hamming code is to be executed, the so-called parity bit of n bits is employed. When there is a bit error in the regular data of m bits, the bit error is identified using the parity bit. Then, the data bit is inverted, for example, and output. The number of bits "n" of the parity bit is set so that the relationship of $2^n - m \geq m+1$ is established based on the relationship between the regular data of m bits and the parity bit of n bits.

More specifically, a predetermined combination using such parity bits indicates the position information, which is called "syndrome", to identify the error position, i.e. the location where a bit error has occurred. In data readout, the parity bits consisting of n bits are received together with the regular data consisting of m bits to calculate a syndrome that is to be generated based on a predetermined exclusive OR operation. The location of an error bit is identified based on the syndrome that is the calculated result to modify the regular m-bit data. This general Hamming code theory is disclosed in, for example, "Industrial Mathematics for Restudy", CQ Publishing Co., Ltd., pp. 47-53.

In general, the ECC circuit must implement a plurality of columns of an exclusive OR circuit (also referred to as "XOR gate" hereinafter) that takes an exclusive OR to calculate a syndrome. Since the number of parity bits increases in proportion to the amount of information, i.e. the number of bits, in the storage device, the number of XOR gates will be inevitably increased according to the amount of information in the storage device, leading to more columns.

Increase in the number of columns of XOR gates induces the problem that the error correction processing rate will become slower.

Japanese Patent Laying-Open Nos. 05-144291 and 2000-132995 disclose a system of improving the integration level to increase the error correction processing rate by relatively reducing the number of columns of the XOR gates.

It is to be noted that, if the operating rate of the XOR gate per se constituting the ECC circuit can be increased, the error correction processing rate can be improved.

The circuit complexity is increased in accordance with the increase in the number of XOR gates, whereby the wiring that connects respective circuits becomes longer. As a result, the rate of error correction processing is degraded.

SUMMARY OF THE INVENTION

In view of the foregoing, an object of the present invention is to provide a semiconductor device further improving the error correction processing rate.

A semiconductor device according to an aspect of the present invention includes a memory cell array storing a data group formed of a plurality of data bits and a plurality of parity bits, and an error correcting circuit executing correction of an error bit in the plurality of data bits and plurality of parity bits constituting the data group output from the memory cell array. The error correcting circuit includes an XOR circuit group obtaining a syndrome based on a matrix product of a predetermined check matrix represented in binary and a matrix formed of logic values of respective bits in the data group output from the memory cell array, and a correcting circuit correcting an error bit in the plurality of data bits and plurality of parity bits based on the syndrome output from the XOR circuit group. The XOR circuit group includes a plurality of check circuits receiving an input of the plurality of data bits and plurality of parity bits to compute each data of a plurality of bits constituting the syndrome. Each check circuit includes a plurality of XOR gates. Each XOR gate receives every 2 bits of input, and calculates an exclusive OR of the plurality of data bits and plurality of parity bits input corresponding to matrix elements of each row in a predetermined check matrix. The sum of the matrix elements of the predetermined check matrix is set to become lower than a predetermined value.

In accordance with the semiconductor device of the present invention, the number of XOR gates constituting the check circuit can be reduced to allow a smaller layout area. As a result, increase in the number of columns of check circuits formed of a plurality of XOR gates can be suppressed to allow computation of a syndrome at high speed. In other words, the error correction processing can be executed at high speed.

A semiconductor device according to another aspect of the present invention includes a memory cell array storing a data group formed of a plurality of data bits and a plurality of parity bits, and an error correcting circuit executing correction of an error bit in the plurality of data bits and plurality of parity bits constituting the data group output from the memory cell array. The error correcting circuit includes an XOR circuit group obtaining a syndrome based on a matrix product of a check matrix and a matrix formed of logic values of respective bits in the data group output from the memory cell array, and a correcting circuit correcting an error bit in the plurality of data bits and plurality of parity bits based on the syndrome output from the XOR circuit group. The XOR circuit group includes a plurality of XOR gates. Each XOR gate receives every 2 bits of input of the plurality of data bits and plurality of parity bits. Each XOR gate includes first and second transistors for setting an output node at a first logic level and a second logic level based on a predetermined combination of the logic values of every 2 bits input. Each XOR gate has its output node set to the first logic level in a reset state. The second transistor is set to have a drivability greater than that of the first transistor.

According to the semiconductor device of the present aspect, the rate of setting the logic level of the output node to the second logic level from the first logic level identified as a reset state becomes higher as compared to the case where the same drivability is set. Thus, the time required to output a syndrome from the XOR circuit group is reduced. Error correction processing can be executed at high speed.

A semiconductor device according to a further aspect of the present invention includes a memory cell array storing a data group formed of a plurality of data bits and a plurality of parity bits, and an error correcting circuit executing correction on an error bit in the plurality of data bits and plurality of parity bits constituting the data group output from the memory cell array. The error correcting circuit includes an XOR circuit group obtaining a syndrome based on a matrix product of a check matrix and a matrix formed of logic values of respective bits in the data group output from the memory cell array, and a correcting circuit correcting an error bit in the plurality of data bits and plurality of parity bits based on the syndrome output from the XOR circuit group. The XOR circuit group includes a plurality of XOR gates. Each XOR gate receives every 2 bits of input of the plurality of data bits and plurality of parity bits. When there are $2^k$ (k: a natural number of at least 2) inputs to an XOR gate group formed of at least a portion of the plurality of XOR gates to which the plurality of information bits and plurality of parity bits are input, the XOR gate group includes $(2^k-1)$ XOR gates calculating the exclusive OR of $2^k$ inputs. The $(2^k-1)$ XOR gates are arranged in 2 columns.

Accordingly, an effective layout can be executed, allowing reduction in the area of the XOR gate group.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram to describe a parity check table according to the first embodiment.

FIGS. 11A and 11B are diagrams to describe a parity check table according to a second embodiment of the present invention.

FIGS. 12A and 12B, FIGS. 13A and 13B, FIGS. 14A and 14B, and FIG. 15 represent circuit configurations of parity circuits constituting the EXOR Tree circuit.

DESCRIPTION OF THE PREFERRED EMBODIMENTS

Figure 1:
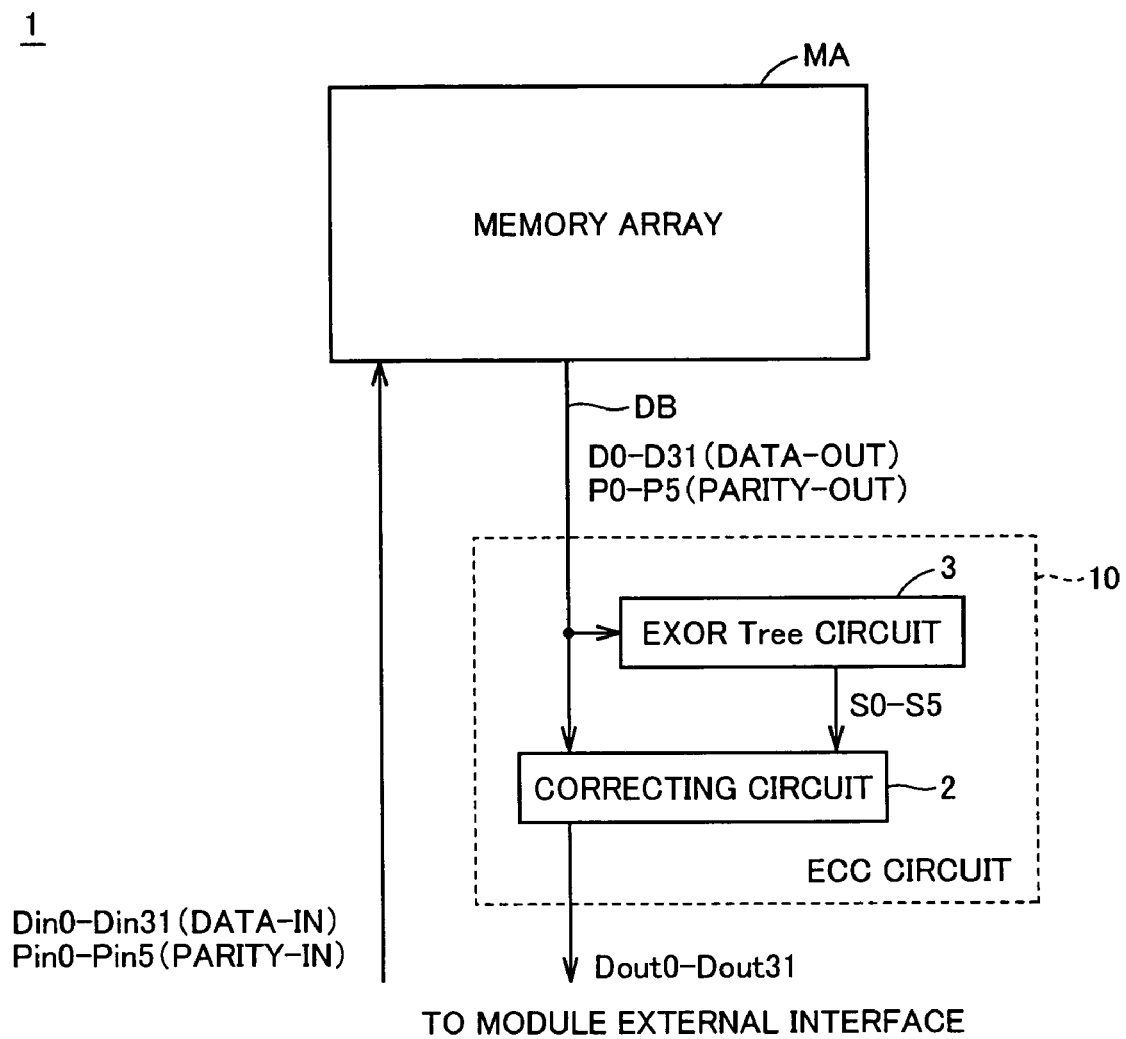
FIG. 1 is a schematic block diagram of a semiconductor device including an ECC circuit according to an embodiment of the present invention.

Embodiments of the present invention will be described hereinafter with reference to the drawings. In the drawings, the same or corresponding components have the same reference characters allotted, and description thereof will not be repeated.

First Embodiment

Referring to FIG. 1, a semiconductor device 1 according to a first embodiment of the present invention includes a memory array MA and an ECC circuit 10.

Memory array MA is provided to store regular data corresponding to the information amount of 32 bits. Parity bits of 6 bits are also applied and stored in memory array MA for the purpose of executing error correction on the 32 data bits.

As shown in FIG. 1, 32 information bits, i.e. data Din0-Din31, and also 6 bits of parity bits, i.e. Pin0-Pin5 to check the information bits, are applied to memory array MA (data-in, parity-in).

In a data read out operation from memory array MA, data is applied to ECC circuit 10 via a data bus DB for execution of error correction processing. Specifically, data bits D0-D31 and parity bits P0-P5 stored in memory array MA are applied to ECC circuit 10 (data-out, parity-out).

ECC circuit 10 of the first embodiment includes a correcting circuit 2 and an EXOR Tree circuit 3.

EXOR Tree circuit 3 receives data bits D0-D31 and parity bits P0-P5 to calculate the syndrome, and outputs syndrome data S0-S5. Syndrome data S0-S5 from EXOR Tree circuit 3 are applied to correcting circuit 2.

Correcting circuit 2 identifies the error position in the 32 data bits D0-D31 based on syndrome data S0-S5, and inverts the error bit data to provide proper data Dout0-Dout31 to a module external interface that function as an interface with an external circuit. The aforementioned output to the module external interface is only a way of example, output to an internal circuit or the like that executes another predetermined function is possible.

Figure 2:
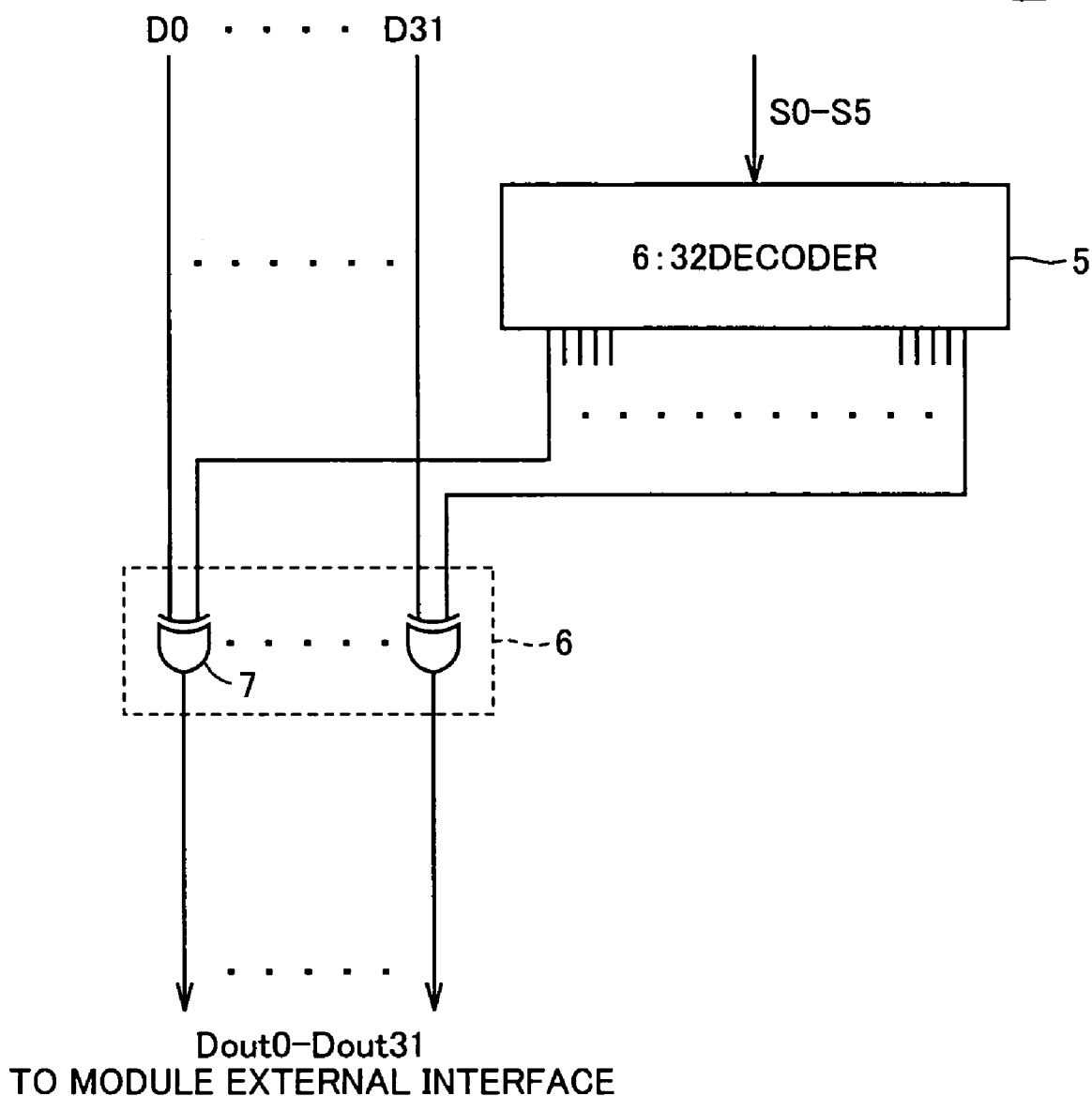
FIG. 2 is a schematic block diagram of a correcting circuit according to a first embodiment of the present invention.

Referring to FIG. 2, correcting circuit 2 of the first embodiment includes a 6:32 decoder 5, and a correction unit 6 formed of exclusive OR circuits (XOR gates) 7.

6:32 decoder 5 receives syndrome data S0-S5 from EXOR Tree circuit 3 to output information of 32 bits identifying the error position in data bits D0-D31.

Correction unit 6 includes a plurality of XOR gates 7 corresponding to the 32-bit data. Each XOR gate 7 receives a corresponding one of data bits D0-D31 and a data input identifying an error position output from 6:32 decoder 5 to invert the error bit data. The plurality of XOR gates 7 output data Dout0-Dout31 to the module external interface.

For example, 6:32 decoder 5 outputs data indicative of error data ("1") to a corresponding XOR gate 7. That corresponding XOR gate 7 inverts data bit D for output.

A method of setting a parity check table according to the first embodiment of the present invention will be described with reference to FIG. 3. This parity check table represents information to identify the error position in the syndrome computation that will be described afterwards.

For example, output of the syndrome result "000100" from the higher order bits identified as S5-S0 indicates that parity bit P2 is the bit data in error.

Similarly, the values of 6 bits represented in binary numbers for all the data bits D0-D31 and parity bits P0-P51 are allocated so as to differ from each other.

Based on this parity check table, a check matrix H of the following expression is provided.

$$H = \begin{pmatrix} 0001100101000110010100110110000100011 \\ 0010011001110000110000001001000101010 \\ 0100110010010001001110001100100110010 \\ 1001001100001001011000001010100011001 \\ 0010001011001010101001011010001010101 \\ 0100010110000101100100010001101000100 \end{pmatrix} \quad (1)$$

$$w = (P2, D0, D1, D2, D3, D4, D5, D6, D7, D8, P4,$$
$$D9, D10, D11, D12, D13, D14, D15, D16, D17,$$
$$P3, P1, P5, D18, D19, D20, D21, D22, P0, D23,$$
$$D24, D25, D26, D27, D28, D29, D30, D31)$$

$$Hw^t = 0^t$$

Specifically, based on the parity check table set forth above, a matrix product of a check matrix H and a matrix w constituting data bits D0-D31 and parity bits P0-P5 can be represented.

Parity bits P0-P5 are stored in memory array MA such that the above equation (1) is met with respect to data bits D0-D31.

Therefore, determination can be made that there is a bit error in the case of the following equation (2).

$$Hw^t \neq 0^t \quad (2)$$

EXOR Tree circuit 3 of the first embodiment calculates the left-hand side of equation (1) to output syndrome data S0-S5 as the syndrome result. Expansion of equation (1) yields the following equations:

$$D0 \oplus D4 \oplus D6 \oplus D7 \oplus D11 \oplus D13 \oplus D14 \oplus D17 \oplus D18 \oplus D22 \oplus P0 \oplus$$
$$D24 \oplus D28 \oplus D29 = S0 \quad (3)$$

$$D1 \oplus D5 \oplus D7 \oplus D8 \oplus D10 \oplus D12 \oplus D14 \oplus D16 \oplus P1 \oplus D18 \oplus D19 \oplus$$
$$D21 \oplus D24 \oplus D26 \oplus D28 \oplus D31 = S1 \quad (4)$$

$$P2 \oplus D2 \oplus D5 \oplus D6 \oplus D10 \oplus D13 \oplus D15 \oplus D16 \oplus D20 \oplus D22 \oplus D23 \oplus$$
$$D27 \oplus D28 \oplus D31 = S2 \quad (5)$$

$$D0 \oplus D3 \oplus D4 \oplus D7 \oplus D9 \oplus D13 \oplus D16 \oplus D17 \oplus P3 \oplus D19 \oplus D20 \oplus$$
$$D21 \oplus D23 \oplus D26 \oplus D27 \oplus D30 = S3 \quad (6)$$

$$D1 \oplus D4 \oplus D5 \oplus D8 \oplus P4 \oplus D9 \oplus D14 \oplus D15 \oplus D19 \oplus D22 \oplus D25 \oplus$$
$$D27 \oplus D29 \oplus D30 = S4 \quad (7)$$

$$D2 \oplus D3 \oplus D6 \oplus D8 \oplus D11 \oplus D12 \oplus D15 \oplus D17 \oplus P5 \oplus D18 \oplus D20 \oplus$$
$$D21 \oplus D25 \oplus D29 \oplus D30 \oplus D31 = S5 \quad (8)$$

With regards to the values allocated to respective bits in FIG. 3, the values in the vertical direction and horizontal direction are set to become smaller than a predetermined number. Specifically, the sum of the matrix elements of check matrix H is set to be smaller than a predetermined number. Here, the sum of the entire matrix elements is set to take a value (natural number) not larger than (n−2)×(m+n), where n is the number of parity bits and m is the number of data bits, by way of example.

Further, the values allocated to respective bits are set such that the values in the vertical direction become smaller than a predetermined number. Here, the value of the sum in the vertical direction, i.e. the sum in each column in check matrix H, is set to take a value (natural number) not larger than (n−2), where n is the number of parity bits. In the table of FIG. 3, the values in the horizontal direction are set to 3 or below.

Further, the values in the horizontal direction are set so as to be smaller than a predetermined number. Here, the value of the sum in the horizontal direction, i.e. the sum in each row in check matrix H, is set to take a value (natural number) not larger than (n−2)×(m+n)/n, where n is the number of parity bits and m is the number of data bits. In the table of FIG. 3, the values in the vertical direction are set to 16 or below.

Furthermore, the values in the vertical direction are set to take an even number. In the table of FIG. 3, such values are "16" and "14", which are both even numbers.

Figure 4A:
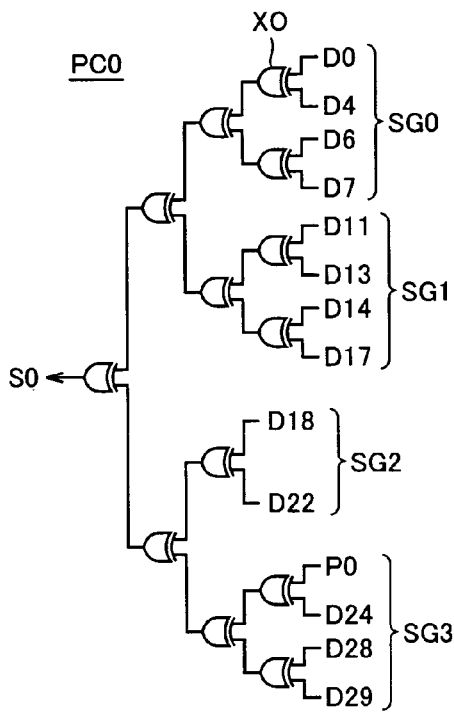
FIGS. 4A and 4B, FIGS. 5A and 5B, and FIGS. 6A and 6B represent circuit configurations of parity circuits constituting an EXOR Tree circuit.

Referring to FIG. 4A, a parity circuit PC0 constituting EXOR Tree circuit 3 is formed of a plurality of XOR gates XO according to equation (3) to output syndrome data S0 identified as an exclusive OR, i.e. syndrome result. Specifically, this corresponds to the result of computing the exclusive OR of data corresponding to "1" in the vertical direction (row direction in check matrix H) in the parity check table of FIG. 3.

Figure 4B:
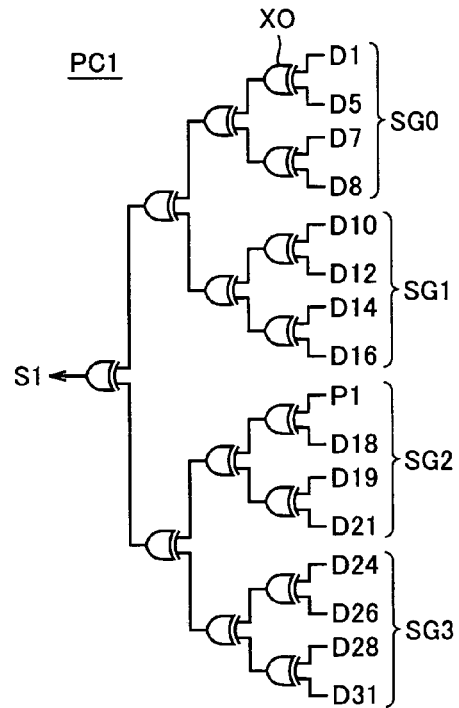

Referring to FIG. 4B, a parity circuit PC1 constituting EXOR Tree circuit 3 is formed of a plurality of XOR gates XO according to equation (4) to output syndrome data S1 identified as an exclusive OR, i.e. syndrome result. Specifically, this corresponds to the result of computing an exclusive OR of data corresponding to "1" in the vertical direction in the parity check table of FIG. 3.

Figure 5A:
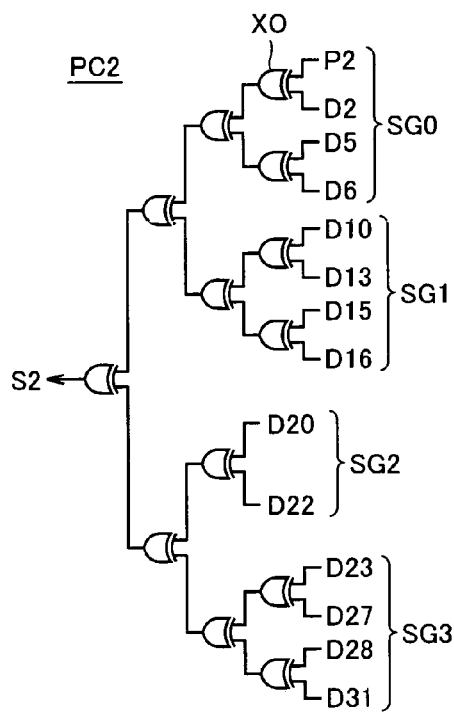

Referring to FIG. 5A, a parity circuit PC2 constituting EXOR Tree circuit 3 is formed of a plurality of XOR gates XO according to equation (5) to output syndrome data S2 identified as an exclusive OR, i.e. syndrome result. Specifically, this corresponds to the result of computing an exclusive OR of data corresponding to "1" in the vertical direction of the parity check table of FIG. 3.

Figure 5B:
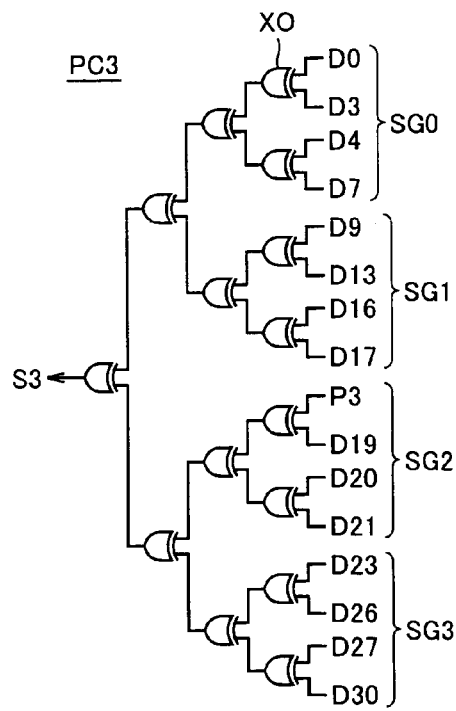

Referring to FIG. 5B, a parity circuit PC3 constituting EXOR Tree circuit 3 is formed of a plurality of XOR gates XO according to equation (6) to output syndrome data S3 identified as an exclusive OR, i.e. syndrome result. Specifically, this corresponds to the result of computing an exclusive OR of data corresponding to "1" in the vertical direction in the parity check table of FIG. 3.

Figure 6A:
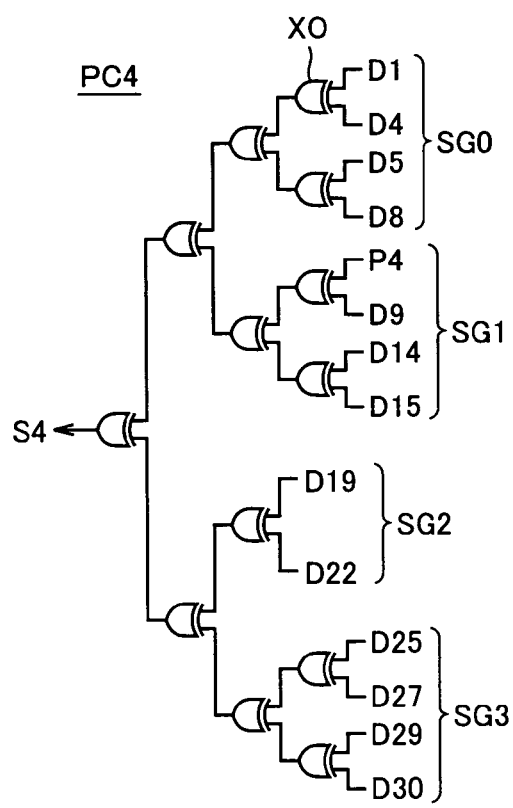

Referring to FIG. 6A, a parity circuit PC4 constituting EXOR Tree circuit 3 is formed of a plurality of XOR gates XO according to equation (7) to output syndrome data S4 identified as an exclusive OR, i.e., syndrome result. Specifically, this corresponds to the result of computing an exclusive OR of the data corresponding to "1" in the vertical direction in the parity check table of FIG. 3.

Figure 6B:
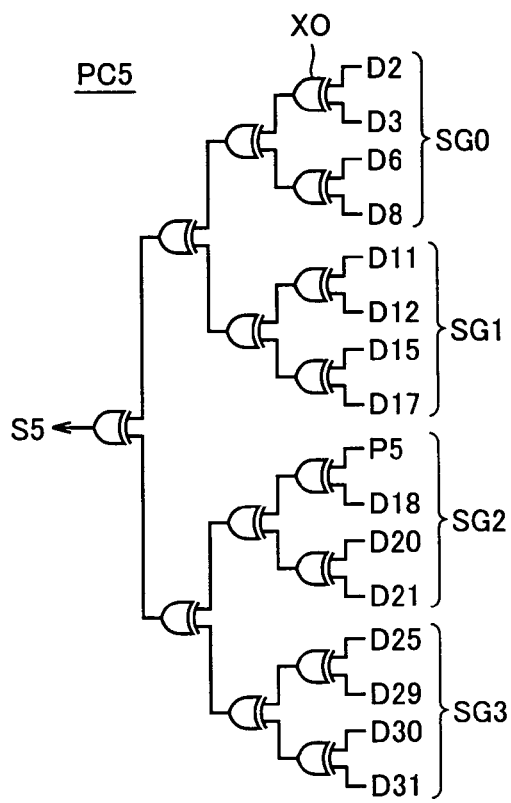

Referring to FIG. 6B, a parity circuit PC5 constituting EXOR Tree circuit 3 is formed of a plurality of XOR gates XO according to equation (8) to output syndrome data S5 identified as an exclusive OR, i.e. syndrome result. Specifically, this corresponds to the result of computing an exclusive OR of data corresponding to "1" in the vertical direction in the parity check table of FIG. 3.

By setting the sum of each row and each column of the matrix elements in check matrix H to be smaller than a predetermined number, the number of XOR gates constituting parity circuit PC can be reduced. Accordingly, the layout area can be reduced. As a result, increase in the number of columns of the parity circuits PC formed of a plurality of XOR gates can be suppressed to allow the syndrome to be computed at high speed. In other words, error correction processing can be executed at high speed.

Figure 7:
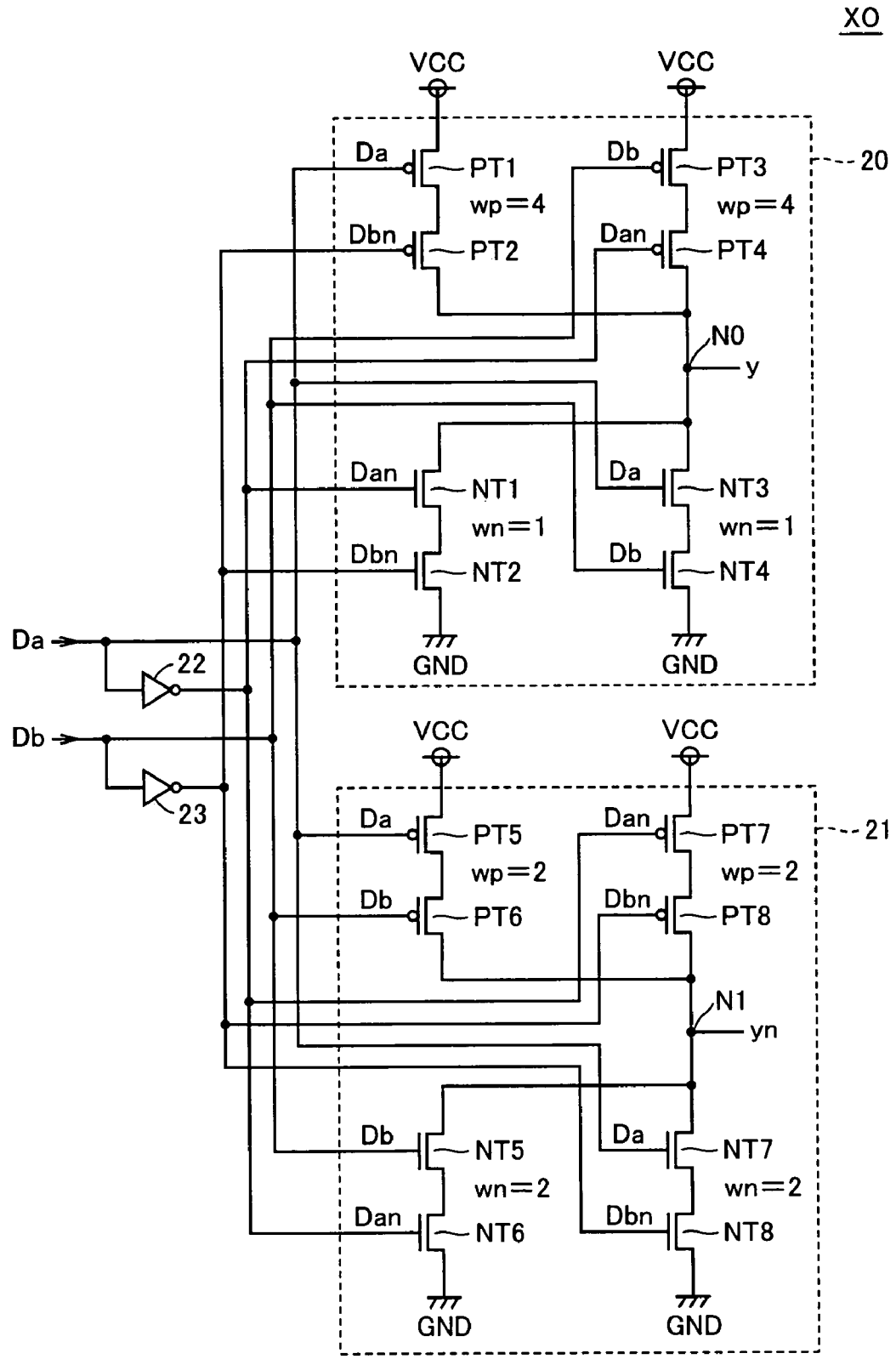
FIG. 7 represents a circuit configuration of an XOR gate.

Referring to FIG. 7, XOR gate XO includes logic units 20 and 21. XOR gate XO receives the inputs of an input signal Da and an inverted signal thereof Dan, and inputs of an input signal Db and an inverted signal thereof Dbn to compute an exclusive OR and generate an output signal y and an inverted signal thereof yn.

Logic unit 20 receives the input signals of Da, Dan, Db and Dbn to generate an output signal y.

Logic unit 21 receives the input signals of Da, Dan, Db and Dbn to output an output signal yn that is an inverted version of output signal y.

Logic unit 20 includes transistors PT1-PT4 and transistors NT1-NT4. Transistors PT1 and P2 are connected in series between a power supply voltage VCC and a node N0 to receive input signals Da and Dbn at their gates. Transistors PT3 and PT4 are connected in series between power supply voltage VCC and output node N0 to receive input signals Db and Dan at their gates. Transistors PT1 and PT2 are connected parallel to transistors PT3 and PT4.

Transistors NT1 and NT2 are connected in series between output node N0 and ground voltage GND to receive input signals Dan and Dbn at their gates. Transistors NT3 and NT4 are connected in series between output node N0 and ground voltage GND to receive input signals Da and Db at their gates. Transistors NT1 and NT2 are connected parallel to transistors NT3 and NT4.

Logic unit 21 includes transistors PT5-PT8 and transistors NT5-NT8. Transistors PT5 and PT6 are connected in series between power supply voltage VCC and an output node N1 to receive input signals Da and Db at their gates. Transistors PT7 and PT8 are arranged between power supply voltage VCC and output node N1 to receive input signals Dan and Dbn at their gates. Transistors PT5 and PT6 are connected parallel to transistors PT7 and PT8.

Transistors NT5 and NT6 are connected in series between output node N1 and ground voltage GND to receive input signals Db and Dan at their gates. Transistors NT7 and NT8 are connected in series between output node N1 and ground voltage GND to receive input signals Da and Dbn at their gates. Transistors NT5 and NT6 are connected parallel to transistors NT7 and NT8.

Transistors PT1-PT8 correspond to P channel MOS transistors. Transistors NT1-NT8 correspond to N channel MOS transistors.

An operation of XOR gate XO of FIG. 7 will be described hereinafter. In the present embodiment, it is assumed that the high voltage level of "H" is set when data signals Da and Db take the binary logic level of "1", and the low voltage level of "L" is set when data signals Da and Db take the binary logic level of "0".

For example, when data signals Da and Db are both "1" or "0", transistors NT3 and NT4 or transistors NT1 and NT2 are turned on in logic unit 20. Therefore, output node N0 is set to the "L" level. In other words, output signal y is "0". Similarly, transistors PT7 and PT8 or transistors PT5 and PT6 are turned on in logic unit 21. Therefore, output node N1 is set at the H level. In other words, output signal yn is "1".

When the logic levels of data signals Da and Db differ such as "1" and "0", transistors PT3 and PT4 or transistors PT1 and PT2 are turned on in logic unit 20. Therefore, output node N0 is set at the H level. In other words, output signal y is "1". Similarly, transistors NT7 and NT8 or transistors NT5 and NT5 are turned on in logic unit 21. Therefore, output node N1 is set at the "L" level. In other words, output signal yn is "0". It is assumed that input signals Da and Db are both applied with "1" or "0" in the initial state (reset state), as will be described afterwards. Therefore, output nodes N0 and N1 are set to the "L" level and "H" level, respectively.

XOR gate XO according to the first embodiment of the present invention has its drivability adjusted by controlling the size of the P channel MOS transistors and N channel MOS transistors.

Specifically, in logic unit 20, the size wp of P channel MOS transistors PT1-PT4 is set 4 times the size wn of N channel MOS transistors NT1-NT4. When the size of P channel MOS transistors and the size of N channel MOS transistors are set at 2:1, respective transistors have the same level of drivability. Therefore, the drivability of the P channel MOS transistor is larger than that of the N channel MOS transistor here.

In the aforementioned reset state, output node N0 has its logic level set to "L". When the logic levels of input signals Da and Db do not match each other under this state, the logic level of output node N0 is set to "H". Since the drivability of the P channel MOS transistor is set high as compared to that of the N channel MOS transistor in the present embodiment, the speed of output node N0 being set to the logic level of "H" is faster than that of the case in which the same drivability is set.

In logic unit 21, the size wp of P channel MOS transistors PT5-PT8 is set equal to the size wn of N channel MOS transistors NT5-NT8. The transistors will have the same level of drivability when the size of the P channel MOS transistor and the size of the N channel MOS transistor is set as 2:1, as mentioned above. Therefore, the drivability of the N channel MOS transistor is larger than that of P channel MOS transistor here.

In a reset state, output node N1 is set to the logic level of "H". When the logic levels of input signals Da and Db do not match each other under such a state, the logic level of output node N1 is set to "L". Since the drivability of the N channel MOS transistor is set larger as compared to that of the P channel MOS transistor, the speed of output node N1 being set to the logic level of L becomes faster than the case where the same drivability is set.

XOR gate XO of the present invention is designed to be driven at high speed when the logic levels of output nodes N0 and N1 make a transition from the "L" level and the "H" level corresponding to a reset state.

Therefore, the speed of setting syndrome data S0-S5 identified as the syndrome result to "1" in each parity circuit PC formed of a plurality of XOR gates becomes faster than that of the case where the XOR gates are set at the same drivability. In other words, a syndrome is calculated speedily at parity circuit PC.

Figure 8:
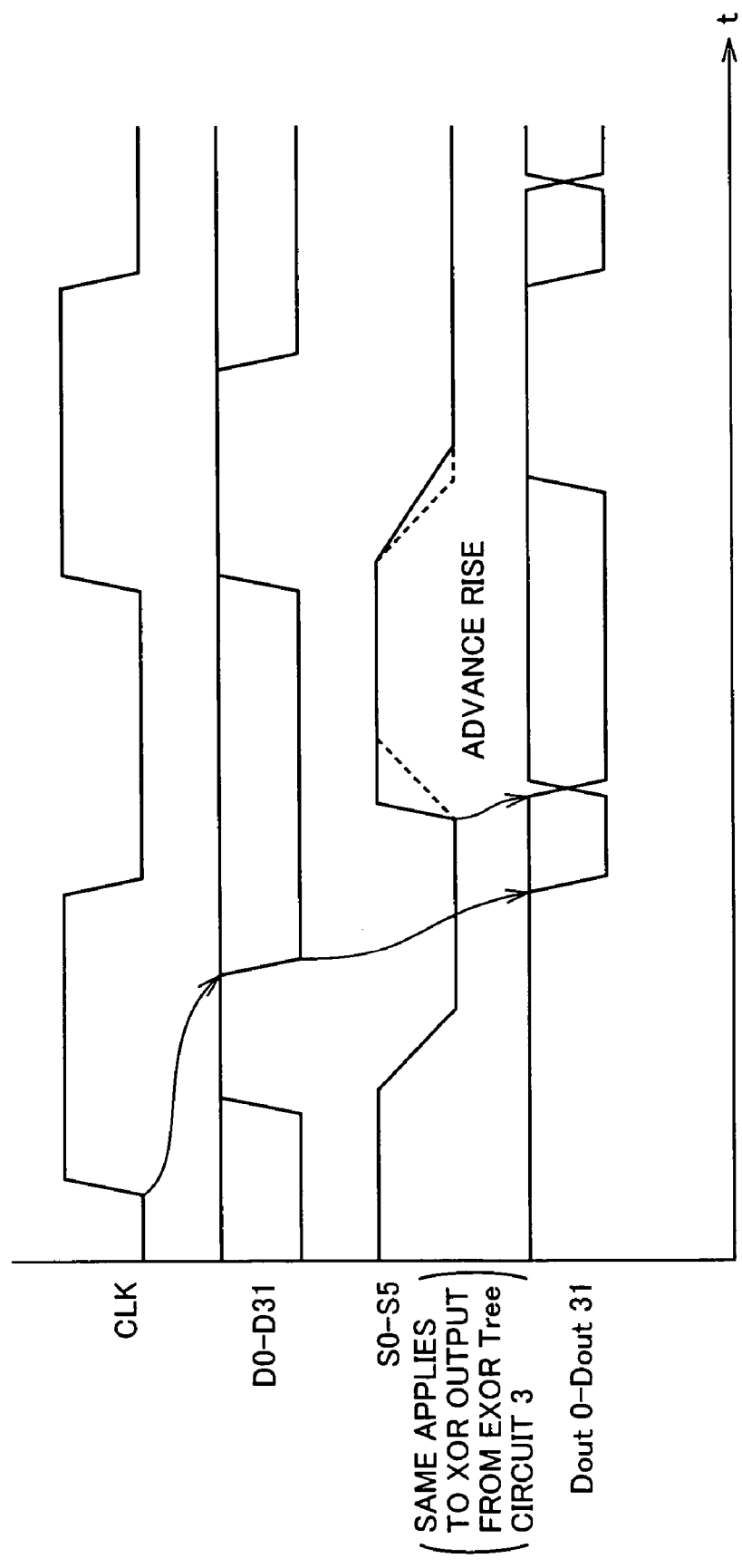
FIG. 8 is a timing chart to describe data output when XOR gates of the first embodiment are used.

Output of data Dout0-Dout31 through XOR gates of the present embodiment will be described with reference to FIG. 8.

Semiconductor device 1 operates in synchronization with a system clock CLK. In the present embodiment, data readout is executed to output data bits D0-D31 onto data bus DB. Then, data bits D0-D31 are applied to ECC circuit 10 together with parity bits P0-P5 for the execution of error correction processing. By advancing the drive from "L" and "H" levels corresponding to the reset state through usage of the XOR gates of the present embodiment, the time required to output a syndrome can be reduced than in the conventional error correction processing indicated by the dotted line in FIG. 8. The output rate of syndrome data S0-S5 is improved to execute error correction processing at high speed, whereby the output rate of data Dout0-Dout31 provided to the module external interface can be improved.

XOR gate 7 according to the present embodiment shown in FIG. 7 outputs a signal y and an inverted signal thereof yn based on four inputs, i.e. input signal Da and corresponding inverted signal Dan, and also input signal Db and corresponding inverted signal Dbn. Although it is necessary to provide an inverter to generate an inverted signal for input signals Da and Db, it is to be noted that inverted signal yn is generated parallel to output signal y. Therefore, an additional inverter for signal inversion at the succeeding columns of XOR gates XO is not required. For example, when parity circuit PC is implemented with a plurality of XOR gates as shown in FIGS. 4-6, inverters 22 and 23 shown in FIG. 7 must be provided to generate inverted signals of the input signal at the first column of XOR gate XO. However, inverters 22 and 23 do not have to be provided for the succeeding columns of XOR gates XO. This means that the number of circuits from input of a signal to output is reduced. In other words, the load is alleviated such that parity circuit PC operating at high speed can be realized.

In the present embodiment, the number of inputs for parity circuits PC constituting EXOR Tree circuit 3 is set to an even number. Specifically, the number of inputs of each of parity circuits PC0-PC5 of FIGS. 4-6 is "14" or "16", i.e. an even number, as shown in the parity check table. Therefore, if parity circuits PC0-PC5 of the first embodiment has data "0" or "1" applied to the input terminals to which respective data bits D0-D31 and parity bits P0-P5 are input at the reset column, syndromes S0-S5 are all set to "0" corresponding to a reset state. If the number of inputs is set to an odd number, syndromes S0-S5 will not be set to "0" corresponding to a reset state unless "0" is applied to the input terminals to which data bits D0-D31 and parity bits P0-P5 are applied at the reset column. By setting the number of inputs to an even number, the degree of freedom in design for a reset state can be improved.

An effective layout of XOR gates will be described hereinafter with reference to FIG. 9.

Figure 9:
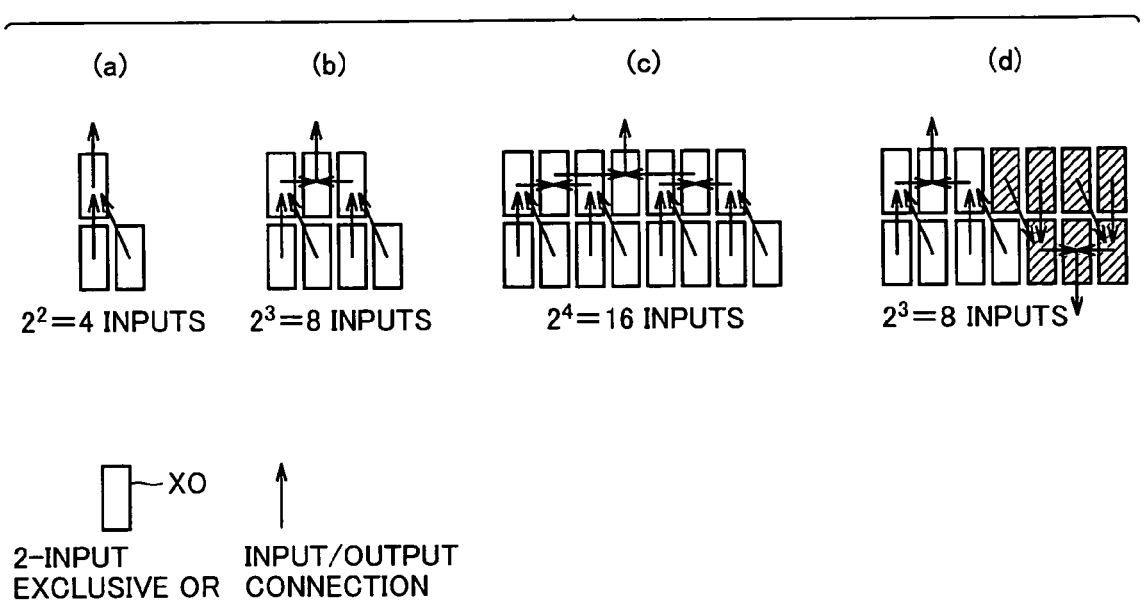
FIG. 9 is a schematic diagram to describe an effective layout scheme according to an embodiment of the present invention.

FIG. 9 (a) corresponds to the layout of XOR gates XO in the unit of $2^2$, i.e. 4, inputs as one unit. It is appreciated that 3 XOR gates XO are employed to form an XOR gate group to calculate an exclusive OR of 2 columns.

FIG. 9 (b) corresponds to the layout of XOR gates XO with $2^3$, i.e. 8, inputs as one unit. It is appreciated that 7 XOR gates XO are employed to form an XOR gate group calculating an exclusive OR of 2 columns.

FIG. 9 (c) corresponds to the layout of XOR gates XO with $2^4$, i.e. 16, inputs as one unit. It is appreciated that 15 XOR gates XO are employed to form an XOR gate group calculating an exclusive OR of 2 columns.

In other words, $(2^k-1)$ XOR gates XO are employed when there are $2^k$(k: natural number of at least 2) inputs to form an XOR gate group calculating an exclusive OR of two columns. By such a layout of 2-column configuration, the layout efficiency can be improved to suppress increase in the layout area of the XOR gate group.

The layout scheme set forth above is advantageous in that, when there are two XOR gate groups with 8 inputs, for example, as one unit XOR gate groups can be arranged and formed with high area efficiency as shown in FIG. 9(d) by combining the two XOR gate groups so as to be arranged in an inverted manner with respect to each other to reduce the area occupied by the two XOR gate groups. In the case where XOR gate XO takes a rectangular configuration, by way of example, a rectangular layout of high area efficiency can be achieved by combining the two XOR gate groups.

Figure 10:
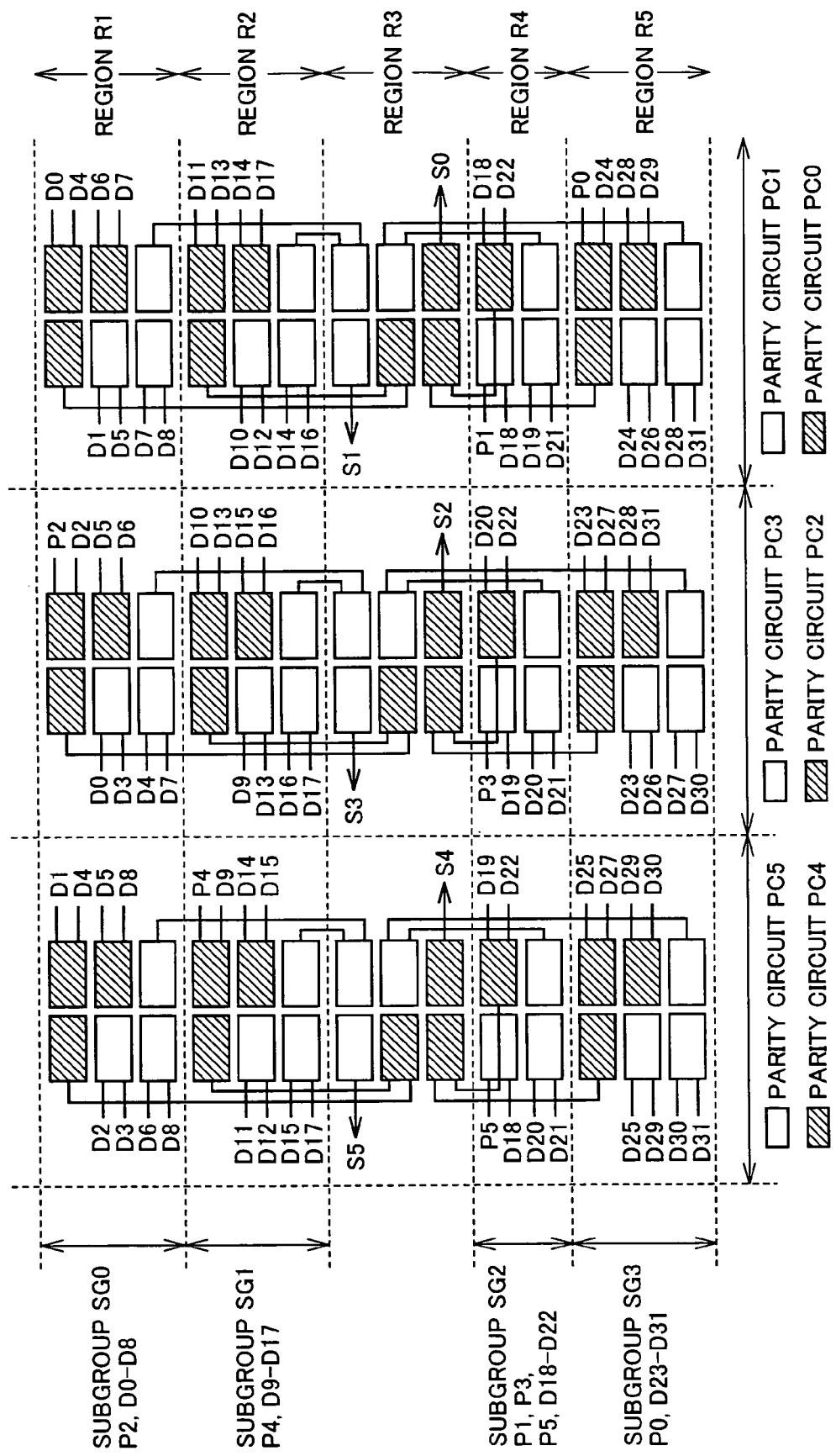
FIG. 10 is a diagram to describe the case in which the layout of parity circuits is executed according to the scheme described with reference to FIG. 9.

FIG. 10 is a diagram to describe a layout of parity circuits PC0-PC5 executed according to the scheme described with reference to FIG. 9.

Referring to FIG. 10, parity circuits PC0 and PC1 are arranged at the right side region of FIG. 10. By the combining arrangement of XOR gate groups constituting parity circuits PC0 and PC1, an efficient layout is achieved so as to reduce the area of parity circuits PC0 and PC1.

At the center region of FIG. 10, parity circuits PC2 and PC3 are arranged. By the combining arrangement of XOR gate groups constituting parity circuits PC2 and PC3, an effective layout is achieved so as to reduce the area of parity circuits PC2 and PC3.

At the left side region of FIG. 10, parity circuits PC4 and PC5 are arranged. By the combining arrangement of XOR gate groups constituting parity circuits PC4 and PC5, an effective layout is achieved so as to reduce the area of parity circuits PC4 and PC5.

In the present embodiment, the input data and parity bits are divided into a plurality of subgroups in the parity check table of FIG. 3, each subgroup corresponding to a predetermined number of input data and predetermined number of parity bits. Specifically, subgroup SG0 includes parity bit P2 and data bits D0-D8. Subgroup SG1 includes parity bit P4 and data bits D9-D17. Subgroup SG2 includes parity bits P1, P3 and P5, and data bits D18-D22. Subgroup SG3 includes parity bit P0 and data bits D23-D31.

Each of parity circuits PC0-PC5 is arranged corresponding to the plurality of subgroups such that the data bits and parity bits included in each of the divided subgroup are in proximity to each other.

For example, the top region R1 of each of parity circuits PC0-PC5 is applied with data bits and parity bits corresponding to subgroup SG0. The second region R2 is applied with data bits and parity bits corresponding to subgroup SG1. The third region R3 has XOR gate groups formed to output syndrome data S0-S5 identified as the syndrome result. The fourth region R4 is applied with data bits and parity bits corresponding to subgroup SG2. The fifth region R5 is applied with data bits and parity bits corresponding to subgroup SG3.

Since data applied to each predetermined region is arranged in close proximity in each parity circuit, the routing of wiring such as the data input line can be suppressed to reduce the wiring length. Thus, the load can be further reduced to allow execution of error correction processing at higher rate.

Second Embodiment

A parity check table according to a second embodiment of the present invention will be described with reference to FIGS. 11A and 11B.

The second embodiment corresponds to the case where data bits of 64 bits and 7 parity bits are stored in memory array MA.

A parity check table is set according to the scheme described with reference to FIG. 3. In the second embodiment, the values of 7 bits represented in binary numbers are allocated with respect to respective data bits and parity bits such that the values of 7 bits differ. Further, the sum of matrix elements in each row and each column of check matrix H is set so as to become lower than a predetermined value. The sum in the horizontal direction (column direction in check matrix H) is set to 4 or below. The sum in the vertical direction (row direction in check matrix H) is set to be 28 or below.

Referring to FIG. 12A, a parity circuit PC6# constituting EXOR Tree circuit 3 is formed of a plurality of XOR gates XO to output syndrome data S6 identified as an exclusive OR, i.e. the syndrome result. Specifically, this corresponds to a result computing an exclusive OR of data corresponding to "1" in the vertical direction in the parity check table of FIGS. 11A and 11B (row direction in check matrix H).

Referring to FIG. 12B, a parity circuit PC5# constituting EXOR Tree circuit 3 is formed of a plurality of XOR gates XO to output syndrome data S5 identified as an exclusive OR, i.e. the syndrome result. Specifically, this corresponds to the result of computing an exclusive OR of data corresponding to "1" in the vertical direction in the parity check table of FIGS. 11A and 11B.

Figure 13A:
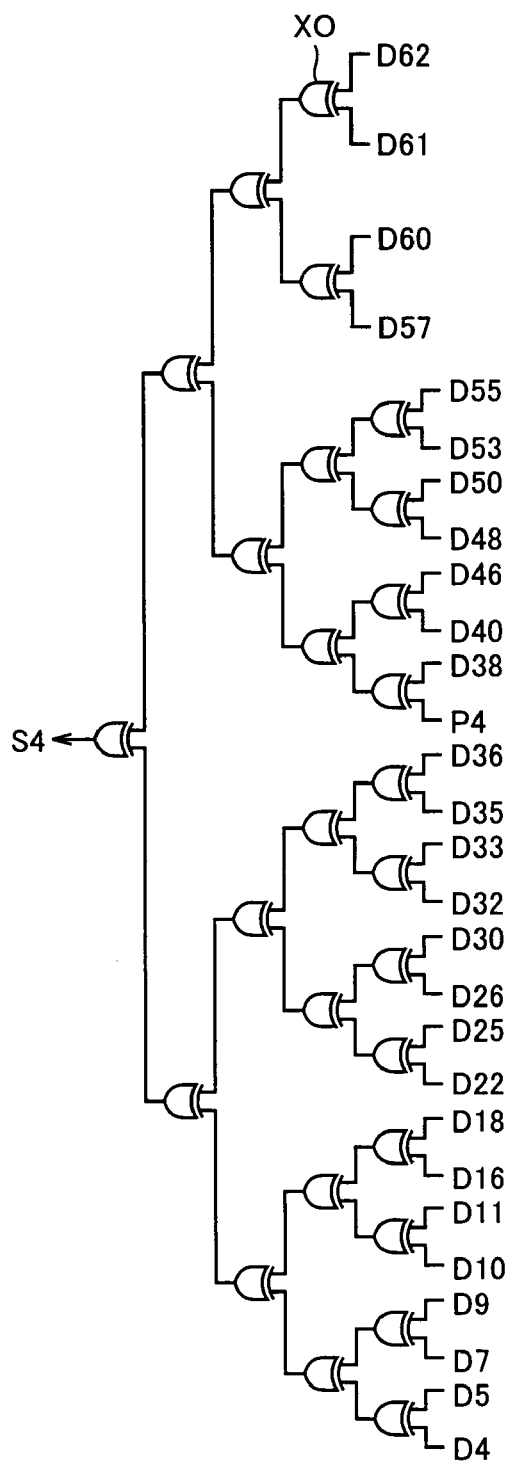

Referring to FIG. 13A, a parity circuit PC4# constituting EXOR Tree circuit 3 is formed of a plurality of XOR gates XO to output syndrome data S4 identified as an exclusive OR, i.e. syndrome result. Specifically, this corresponds to the result of computing an exclusive OR of data corresponding to "1" in the vertical direction in the parity check table of FIGS. 11A and 11B.

Figure 13B:
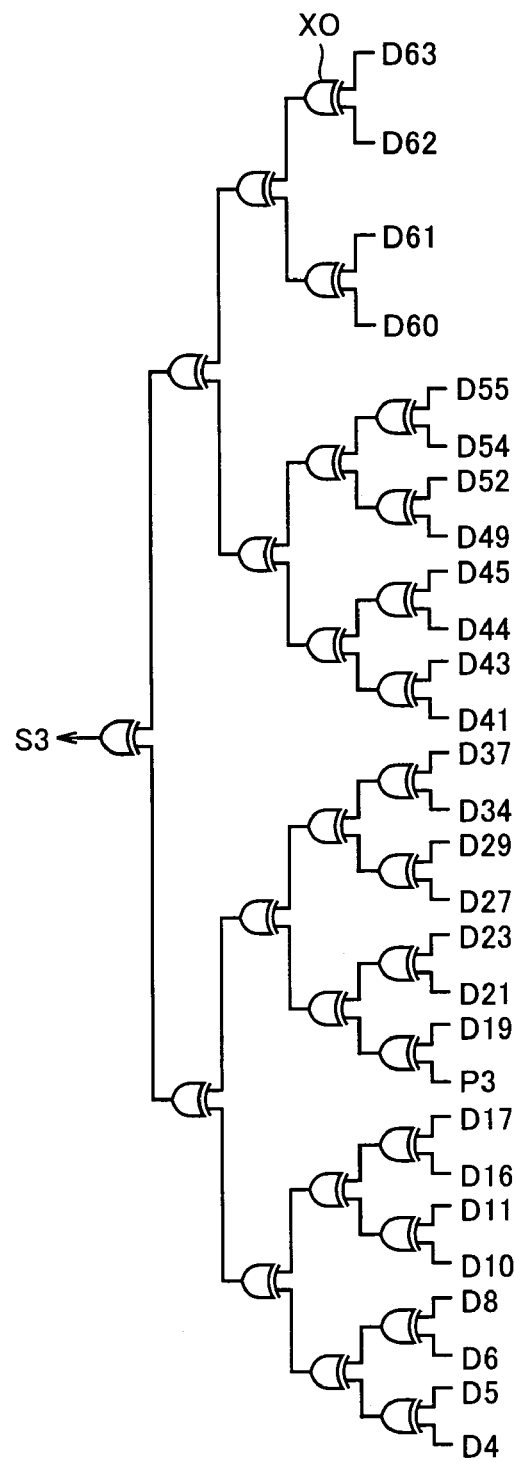

Referring to FIG. 13B, a parity circuit PC3# constituting EXOR Tree circuit 3 is formed of a plurality of XOR gates XO to output syndrome data S3 identified as an exclusive OR, i.e. the syndrome result. Specifically, this corresponds to the result of computing an exclusive OR of data corresponding to "1" in the vertical direction in the parity check table of FIGS. 11A and 11B.

Figure 14A:
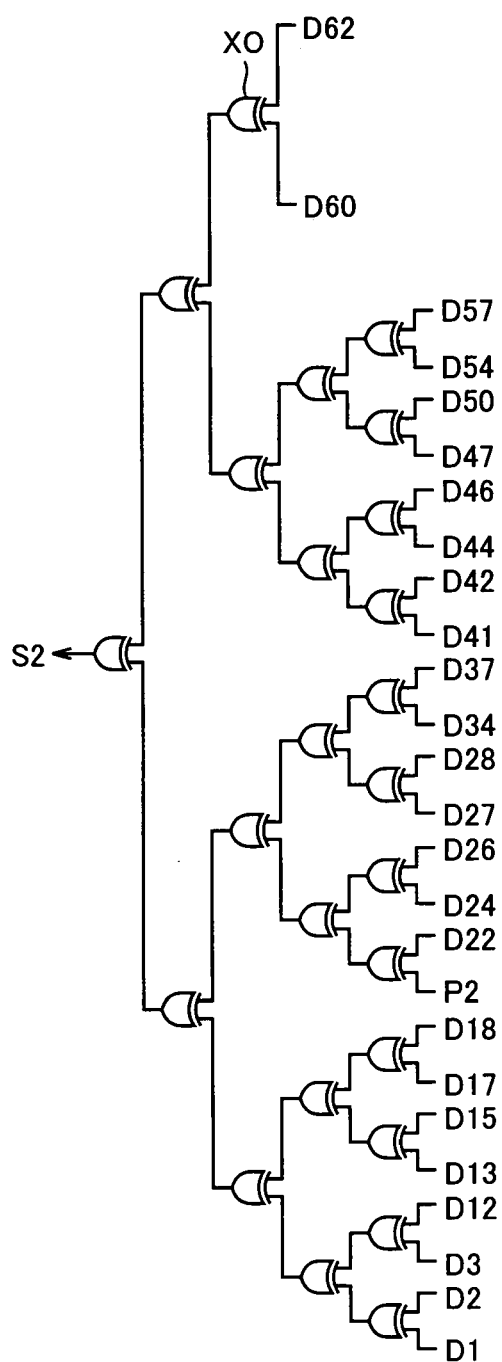

Referring to FIG. 14A, a parity circuit PC2# constituting EXOR Tree circuit 3 is formed of a plurality of XOR gates XO to output syndrome data S2 identified as an exclusive OR, i.e. syndrome result. Specifically, this corresponds to the result of computing an exclusive OR of data corresponding to "1" in the vertical direction in the parity check table of FIGS. 11A and 11B.

Figure 14B:
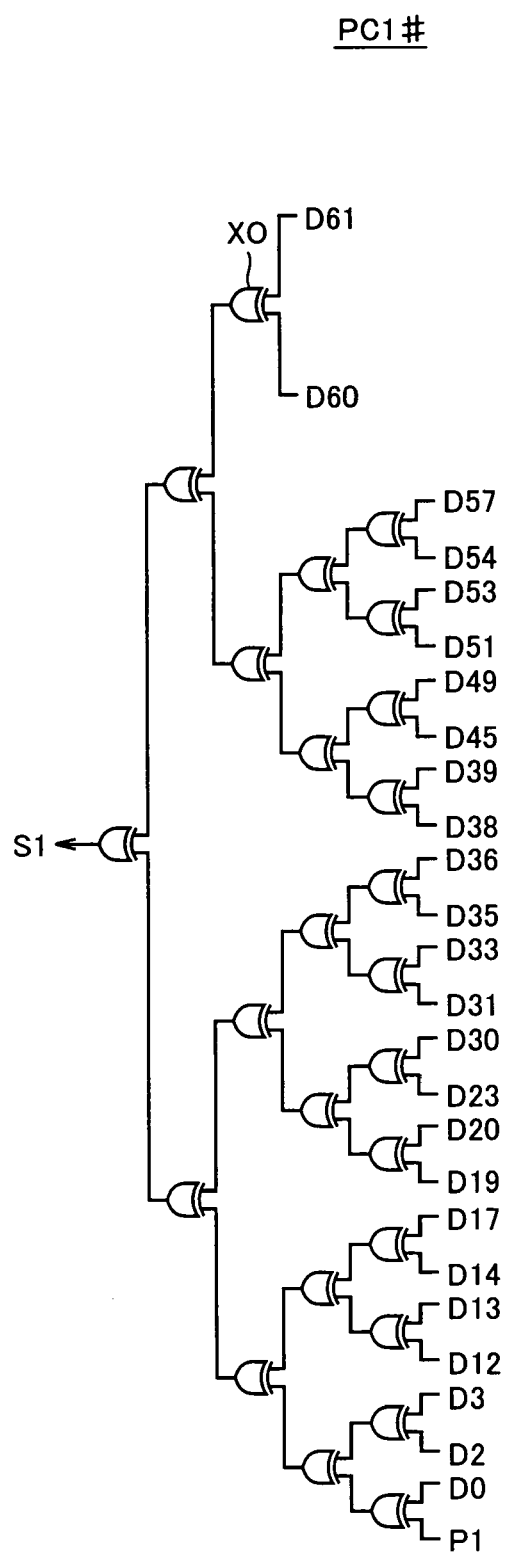

Referring to FIG. 14B, a parity circuit PC1# constituting EXOR Tree circuit 3 is formed of a plurality of XOR gates XO to output syndrome data S1 identified as an exclusive OR, i.e. the syndrome result. Specifically, this corresponds to the result of computing an exclusive OR of data corresponding to "1" in the vertical direction in the parity check table of FIGS. 11A and 11B.

Figure 15:
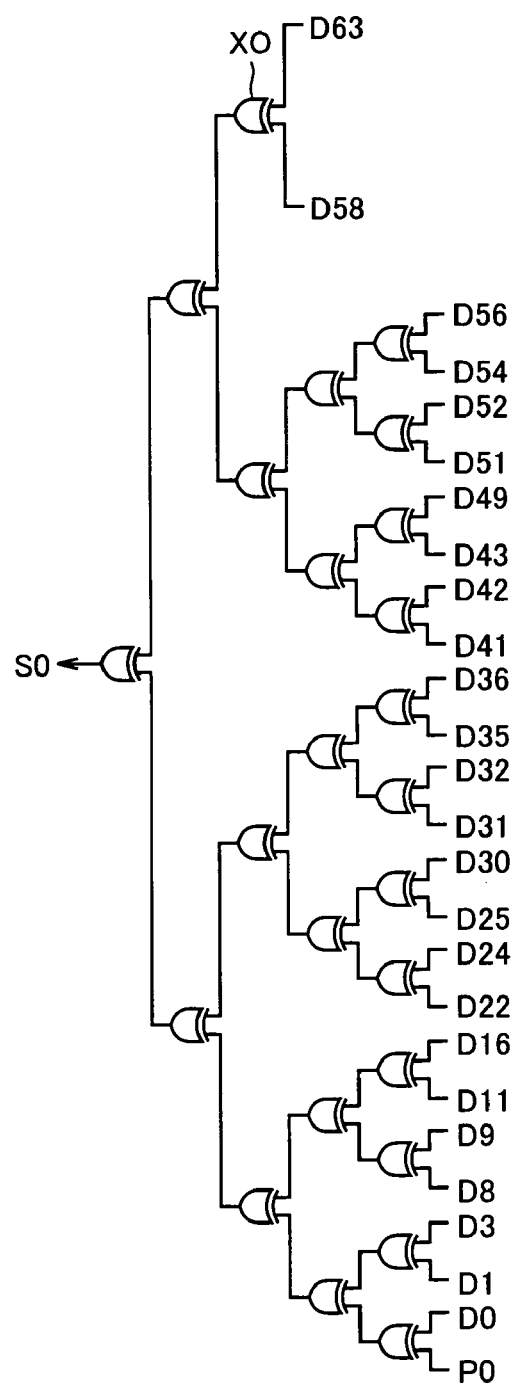

Referring to FIG. 15, a parity circuit PC0# constituting EXOR Tree circuit 3 is formed of a plurality of XOR gates XO to output syndrome data S0 identified as an exclusive OR, i.e. syndrome result. Specifically, this corresponds to the result of computing an exclusive OR of data corresponding to "1" in the vertical direction in the parity check table of FIGS. 11A and 11B.

Figure 16:
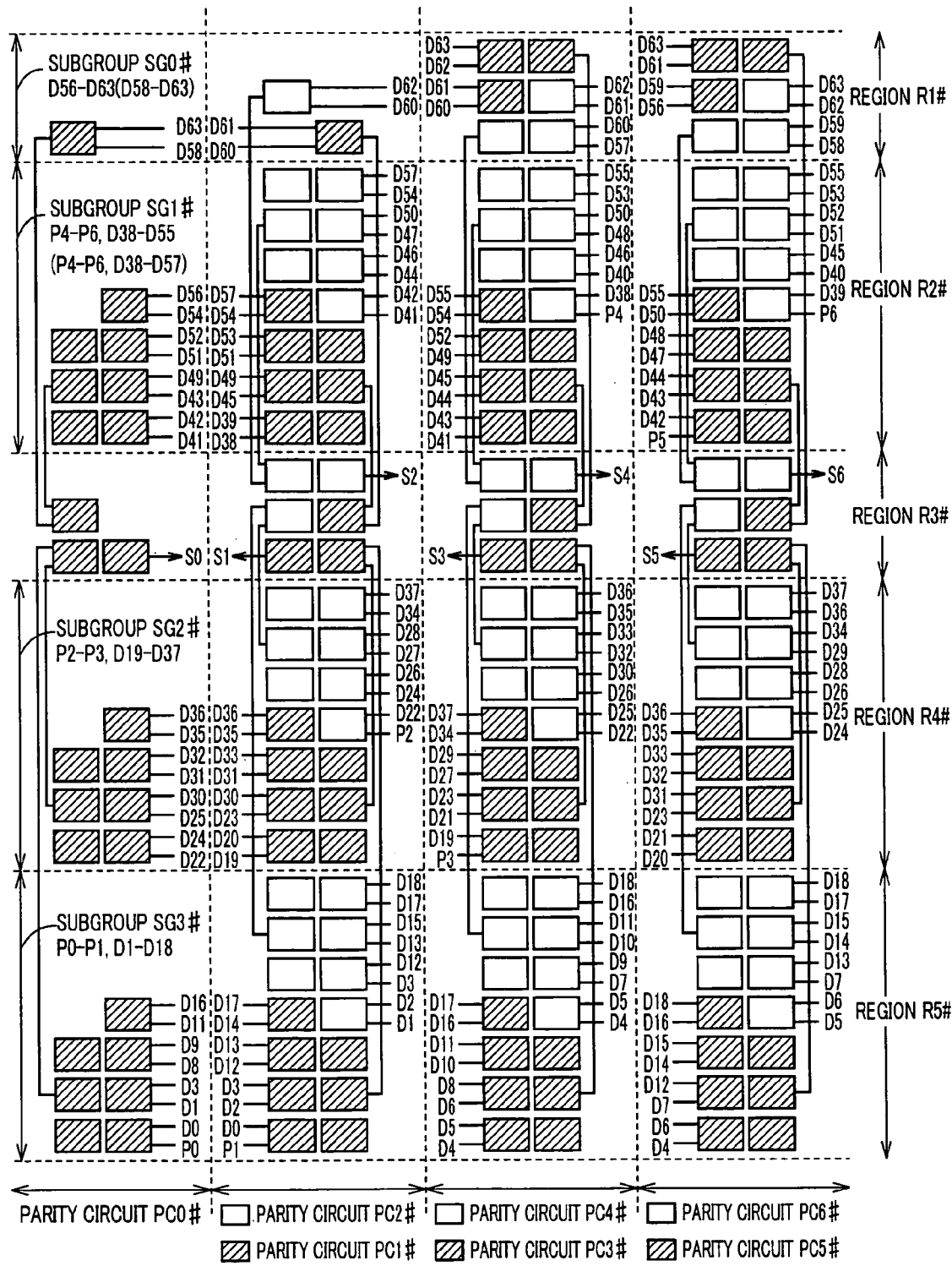
FIG. 16 is a diagram to describe the case in which the layout of parity circuits is executed according to the scheme described with reference to FIG. 9.

FIG. 16 is a diagram to describe a layout of parity circuits PC0#-PC6# set forth above executed according to the scheme described with reference to FIG. 9.

Referring to FIG. 16, parity circuits PC5# and PC6# are arranged at the rightmost region of FIG. 16. An effective layout is achieved such that the area of parity circuits PC5# and PC6# is reduced by arranging in combination XOR gate groups constituting parity circuits PC5# and PC6#.

At the second region from the right in FIG. 16, parity circuits PC4# and PC3# are arranged. An effective layout is achieved such that the area of parity circuits PC4# and PC3# is reduced by arranging in combination X gate groups constituting parity circuits PC4# and PC3#.

At the third region from the right in FIG. 16, parity circuits PC2# and PC1# are arranged. An effective layout is achieved such that the area of parity circuits PC2# and PC1# is reduced by arranging in combination X gate groups constituting parity circuits PC2# and PC1#.

In the fourth region from the right, i.e. the leftmost region in FIG. 16, parity circuit PC0# is arranged.

In the present embodiment, the input data and parity bits are divided into a plurality of subgroups in the parity check table of FIGS. 11A and 11B, each subgroup corresponding to a predetermined number of data bits and predetermined number of parity bits. Specifically, subgroup SG0# includes data bits D56-D63 with respect to parity circuits PC3#-PC6#, and data bits D58-D63 with respect to parity circuits PC0#-PC2#. Subgroup SG1# includes parity bits P4-P6 and data bits D38-D55 with respect to parity circuits PC3#-PC6#, and parity bits P4-P6 and data bits D38-D57 with respect to parity circuits PC0#-PC2#. Subgroup SG2# includes parity bits P2 and P3 and data bits D19-D37 with respect to all parity circuits PC. Subgroup SG3# includes parity bits P0 and P1, and data bits D1-D18 with respect to all parity circuits PC.

Each of parity circuits PC0#-PC5# are arranged such that data bits and parity bits included in each of the divided subgroups are in proximity to each other, corresponding to the plurality of subgroups.

For example, the top region R1# of each of parity circuits PC0-PC5 is applied with data bits and parity bits corresponding to subgroup SG0#. The second region R2# is applied with data bits and parity bits corresponding to subgroup SG1#. The third region R3# has XOR gate groups formed to output syndrome data S0-S6 identified as the syndrome result. The fourth region R4# is applied with data bits and parity bits corresponding to subgroup SG2#. The fifth region R5# is applied with data bits and parity bits corresponding to subgroup SG3#.

Thus, since the data input for each predetermined region is arranged in close proximity in each parity circuit, the routing of wiring such as a data input line can be suppressed to reduce the wiring length. Thus, the load can be alleviated to allow execution of error correction processing at higher rate.

Figure 17:
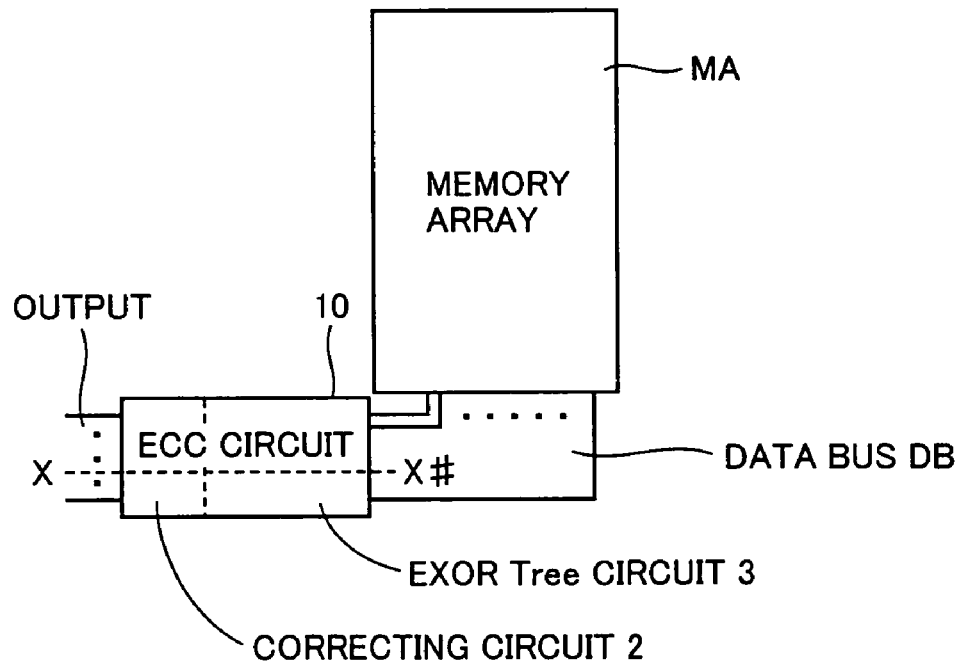
FIG. 17 is a diagram to describe the layout of an ECC circuit and data bus according to an embodiment of the present invention.

FIG. 17 is a diagram to describe a layout of ECC circuit 10 and data bus DB according to the second embodiment of the present invention.

Referring to FIG. 17, ECC circuit 10 includes correcting circuit 2 and EXOR Tree circuit 3. Correcting circuit 2 and EXOR Tree circuit 3 are arranged so as to provide output at the other side with respect to the input from one side from data bus DB. Specifically, the data bits and parity bits at one side from data bus DB are applied to EXOR Tree circuit 3. Then, syndrome data S from EXOR Tree circuit 3 is applied to correcting circuit 2 located at the other side.

Figure 18:
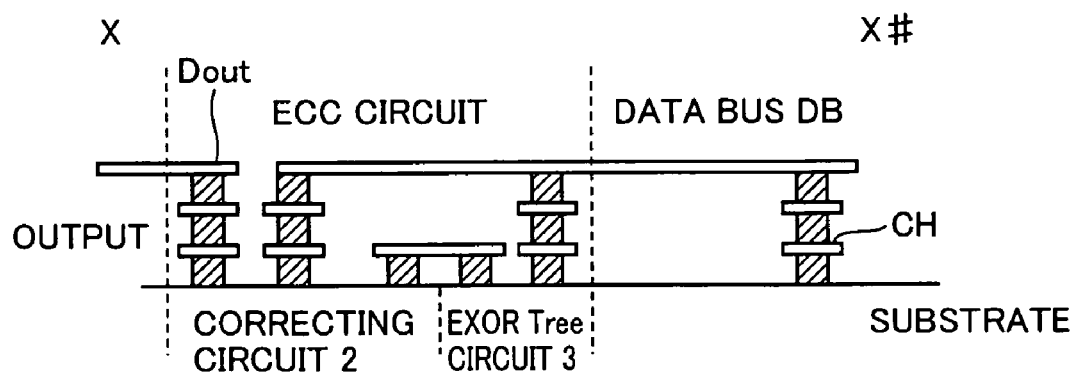
FIG. 18 is a sectional view of the ECC circuit of FIG. 17 taken along line X-X.

FIG. 18 is a sectional view of ECC circuit 10 of FIG. 17 taken along line X-X.

Referring to FIG. 18, an interconnection layer of data bus DB through which data bits and parity bits are transmitted from memory array is depicted. Specifically, data bus DB is formed at the interconnection layer located at the upper side or lower side of the substrate where correcting circuit 2 and EXOR Tree circuit 3 are formed. Data bus DB is connected to correcting circuit 2 and EXOR Tree circuit 3 provided on the substrate via a contact hole CH such that data bits and parity bits are transmitted. For example, data bus DB is arranged on parity circuits PC adjacent along the predetermined direction described with reference to FIG. 10 or FIG. 16.

Furthermore, the pitch of signal lines laid out with respect to correcting circuit 2 and EXOR Tree circuit 3 are designed to be identical.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor device comprising:
   a memory cell array storing a data group formed of a plurality of data bits and a plurality of parity bits, and an error correcting circuit executing correction on an error bit in said plurality of data bits and said plurality of parity bits constituting said data group output from said memory cell array, wherein said error correcting circuit comprises an XOR circuit group obtaining a syndrome based on a matrix product of a check matrix represented in binary and a matrix formed of data logic values of respective bits in said data group output from said memory cell array, and a correcting circuit correcting an error bit in said plurality of information bits and said plurality of parity bits based on said syndrome output from said XOR circuit group, wherein said XOR circuit group includes a plurality of check circuits receiving inputs of said plurality of data bits and said plurality of parity bits to compute each data of a plurality of bits constituting said syndrome, wherein each of said check circuits includes a plurality of XOR gates, each receiving 2 bits from a group comprising said plurality of data bits and said plurality of parity bits, input thereof determined by corresponding to matrix elements of each row in said check matrix, wherein the number of inputs of each check circuit corresponds with the number of said matrix elements having a first state value, wherein said XOR circuit group includes a plurality of said XOR gate group, wherein at least one of said XOR gate groups in each check circuits, which comprises $2^k$ (k: a natural number of at least 2) inputs for inputting said plurality of data bits and said plurality of parity bits and calculates an exclusive OR of $2^k$ inputs, includes ($2^k-1$) XOR gates being arranged in 2 columns and a unit of a predetermined configuration on a semiconductor substrate, and wherein at least two of said plurality of XOR gate groups are arranged in combination in an inverted manner with respect to each other such that an area of said at least two XOR gate groups is reduced.

2. The semiconductor device according to claim 1, wherein said plurality of data bits and plurality of parity bits input are divided into a plurality of groups, and each of said check circuits are arranged such that inputs of said plurality of data bits and said plurality of parity bits included in each of said divided groups are in proximity to each other, corresponding to each of said plurality of groups.

3. The semiconductor device according to claim 1, wherein said data group is formed of n bits of data bits and m bits ($2^m-m \geq n+1$) of parity bits, said check matrix includes matrix elements of m rows and (n +m) columns, each column corresponds to one of $2^m$ combinations of m bits represented in binary numbers, and a sum of each column is set to be lower than a predetermined value.

4. The semiconductor device according to claim 1, wherein said data group is formed of n bits of information bits and m bits ($2^m-m \geq n +1$) of parity bits, said check matrix includes matrix elements of m rows and (n +m) columns, each column corresponds to one of $2^m$ combinations of m bits represented in binary numbers, and a sum of each row is set to be lower than a predetermined value.

5. The semiconductor device according to claim 4, wherein said sum of each row is set to be an even number.

6. The semiconductor device according to claim 1, wherein said plurality of check circuits are arranged adjacent to each other along a predetermined direction, said semiconductor device further comprising a signal line provided along said predetermined direction, and to which said plurality of data bits and said plurality of parity bits are input, said signal line provided at one of an upper portion and lower portion of said plurality of check circuits.

7. The semiconductor device according to claim 6, wherein said plurality of data bits and said plurality of parity bits are applied from one side to another side of said signal line provided along said predetermined direction, an output signal from said plurality of check circuits is applied to said correcting circuit provided at another side along said predetermined direction to execute error correction on said plurality of data bits.

8. The semiconductor device according to claim 7, wherein said plurality of information bits and said plurality of parity bits transmitted through said signal line are applied to said plurality of check circuits and said correcting circuit using the same interconnection layer.

9. The semiconductor device according to claim 8, wherein a wiring pitch of said signal line through which are transmitted said plurality of data bits and said plurality of parity bits applied to said plurality of check circuits and said correcting circuit is identical.

10. A semiconductor device comprising:

a memory cell array storing a data group formed of a plurality of data bits and a plurality of parity bits, and an error correcting circuit executing correction on an error bit in said plurality of data bits and said plurality of parity bits constituting said data group output from said memory cell array, wherein said error correcting circuit comprises an XOR circuit group obtaining a syndrome based on a matrix product of a check matrix and a matrix formed of logic values of respective bits in said data group output from said memory cell array, and a correcting circuit correcting an error bit in said plurality of data bits and said plurality of parity bits based on said syndrome output from said XOR circuit group, said XOR circuit group including a plurality of XOR gates, each receiving 2 bits from a group comprising said plurality of data bits and said plurality of parity bits, each of said XOR gates including first and second transistors to set an output node at a first logic level and a second logic level based on a predetermined combination of logic values input, the output node of each said XOR gate being set to said first logic level in a reset state, said second transistor being set to have a drivability larger than the drivability of said first transistor.

* * * * *